US010768488B2

(12) United States Patent
Iwato et al.

(10) Patent No.: US 10,768,488 B2
(45) Date of Patent: Sep. 8, 2020

(54) METHOD FOR MANUFACTURING LIQUID CRYSTAL DISPLAY DEVICE

(71) Applicant: Panasonic Liquid Crystal Display Co., Ltd., Himeji-shi, Hyogo (JP)

(72) Inventors: Hiroaki Iwato, Hyogo (JP); Makoto Fujimoto, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 16/201,541

(22) Filed: Nov. 27, 2018

(65) Prior Publication Data
US 2019/0219850 A1   Jul. 18, 2019

(30) Foreign Application Priority Data

Jan. 12, 2018   (JP) .................................. 2018-003192

(51) Int. Cl.
*G02F 1/1333* (2006.01)
*G02F 1/1362* (2006.01)
(Continued)

(52) U.S. Cl.
CPC .......... *G02F 1/1339* (2013.01); *G02F 1/1368* (2013.01); *G02F 1/133512* (2013.01);
(Continued)

(58) Field of Classification Search
CPC ........ G02F 1/13; G02F 1/1333; G02F 1/1339; G02F 1/1343; G02F 1/1335; G02F 1/133514; G02F 1/133512; G02F 1/13394; G02F 1/134309; G02F 1/1362; G02F 1/136286; G02F 1/1368; G02F 1/133305; G02F 1/133351; G02F 1/133528;
(Continued)

(56) References Cited

U.S. PATENT DOCUMENTS 8,586,171 B2 * 11/2013 Kim ........................ B32B 37/14
349/122
9,372,364 B2 * 6/2016 Kim ........................ G02F 1/1339
(Continued)

FOREIGN PATENT DOCUMENTS

JP    2000-66227    *  3/2000    ........... G02F 1/1339
JP    2013-152310      8/2013

OTHER PUBLICATIONS

Office Action issued in U.S. Appl. No. 16/196,804, filed Feb. 14, 2020, 10 pages.
(Continued)

Primary Examiner — Thoi V Duong
(74) Attorney, Agent, or Firm — Hamre, Schumann, Mueller & Larson, P.C.

(57) ABSTRACT

A method for manufacturing a liquid crystal display device of the instant application includes a first substrate preparing step of preparing a first substrate including a plurality of source lines and a plurality of gate lines; a second substrate preparing step of preparing a second substrate including a color filter; and a substrate bonding step of bonding the first substrate and the second substrate together using a first seal member. In the substrate bonding step, the first seal member is disposed in a manner that at least a part of the first seal member overlaps the color filter in plan view.

10 Claims, 16 Drawing Sheets

(51) Int. Cl.
*G02F 1/1339* (2006.01)
*G02F 1/1335* (2006.01)
*G02F 1/1368* (2006.01)

(52) U.S. Cl.
CPC .. *G02F 1/133514* (2013.01); *G02F 1/136286* (2013.01); *G02F 2001/133519* (2013.01); *G02F 2201/121* (2013.01); *G02F 2201/123* (2013.01)

(58) Field of Classification Search
CPC ........ G02F 2001/133519; G02F 2001/133388; G02F 2201/121; G02F 2201/123
See application file for complete search history.

(56) References Cited

U.S. PATENT DOCUMENTS

| | | | |
|---|---|---|---|
| 2007/0195255 A1* | 8/2007 | Cho | G02F 1/133351 349/153 |
| 2012/0200820 A1 | 8/2012 | Sato et al. | |
| 2013/0128192 A1* | 5/2013 | Ishikawa | G02F 1/133512 349/96 |
| 2013/0186853 A1 | 7/2013 | Sugimoto et al. | |
| 2014/0300848 A1* | 10/2014 | Mori | G02F 1/1339 349/106 |
| 2017/0299916 A1 | 10/2017 | Kobayashi et al. | |
| 2017/0336666 A1 | 11/2017 | Takasaki et al. | |

OTHER PUBLICATIONS

Office Action issued in U.S. Appl. No. 16/196,804, dated May 29, 2020, 11 pages.

* cited by examiner

DISPLAY SURFACE SIDE

↕

REAR SURFACE SIDE

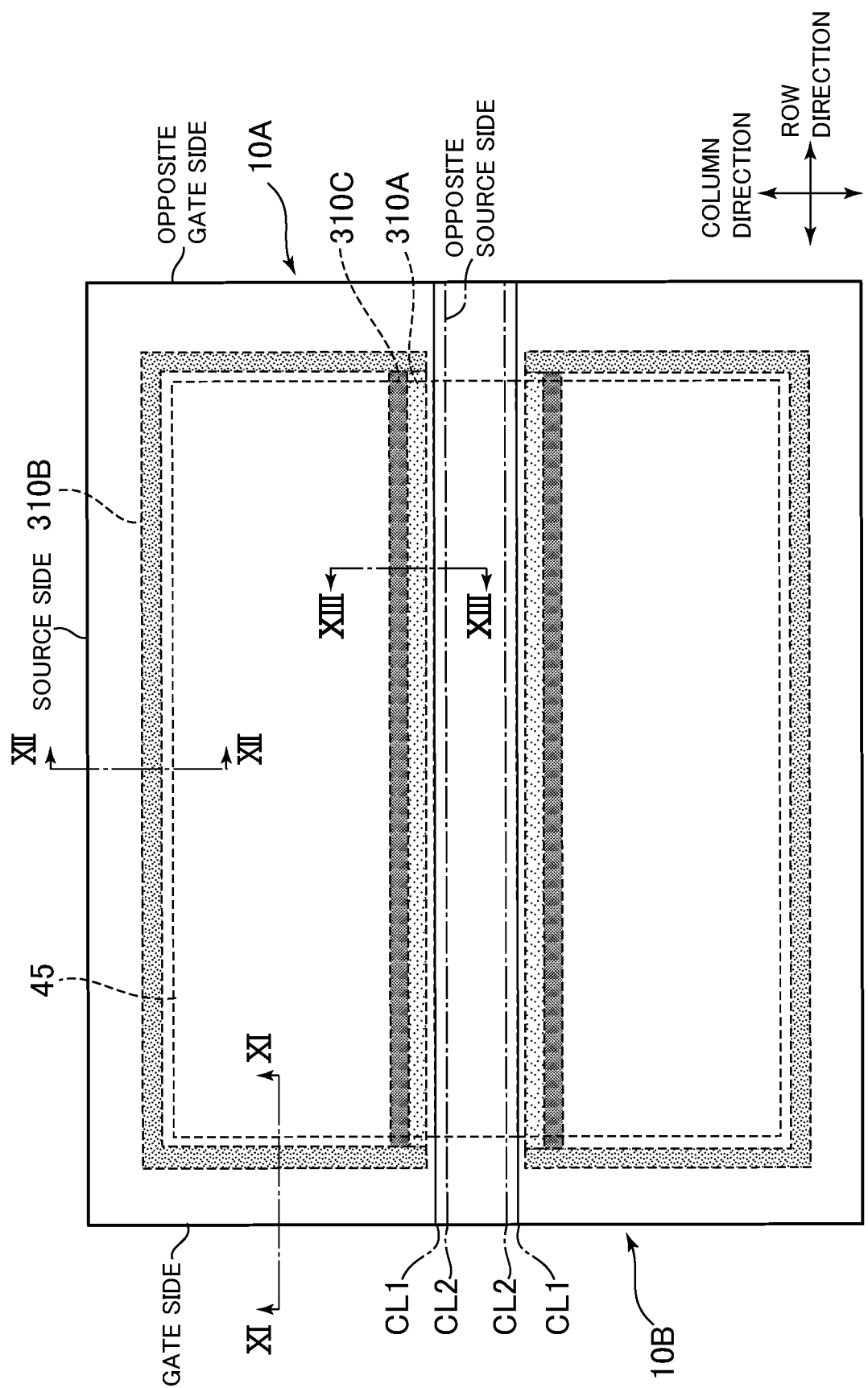

10,768,488 B2

METHOD FOR MANUFACTURING LIQUID CRYSTAL DISPLAY DEVICE

CROSS-REFERENCE TO RELATED APPLICATION

The present application claims priority from Japanese application JP 2018-003192 filed on Jan. 12, 2018, the content of which is hereby incorporated by reference into this application.

TECHNICAL FIELD

The present invention relates to a method for manufacturing a liquid crystal display device.

BACKGROUND

Generally, a liquid crystal display device includes a thin film transistor substrate, a color filter substrate, and a seal member for bonding the two substrates together. The color filter substrate includes color filters provided in a display region, and the periphery of the display region is a non-display region. The color filters are formed in accordance with the contours of display panels, and the seal member is disposed in the non-display region where the color filters are not disposed (for example, see Unexamined Japanese Patent Publication No. 2013-152310).

In the above-described conventional configuration, there has been a problem of further improving production efficiency. That is, in order to realize the above-described configuration, since it is necessary to individually prepare masks for forming color filters in accordance with the contours of display panels having different sizes, there has been a problem of further improving production efficiency.

The present invention has been made in view of the above-described problem, and an object thereof is to further improve the production efficiency of a liquid crystal display device.

SUMMARY

In one general aspect, the instant application describe a liquid crystal display device comprising: a first substrate including source lines and gate lines; a second substrate that is disposed opposite the first substrate and includes a color filter; a liquid crystal layer disposed between the first substrate and the second substrate; and a first seal member that is disposed between the first substrate and the second substrate and surrounds at least a part of a periphery of the liquid crystal layer in plan view. At least a part of the first seal member overlaps the color filter in plan view.

The above general aspect may include one or more of the following features. The liquid crystal display device may further comprising a first side constituting at least a part of an outer shape of the liquid crystal display device. In a region along the first side, the first seal member and the color filter overlap each other in plan view.

The liquid crystal display device may further comprising a second side that is opposed to the first side and constitutes at least a part of an outer shape of the liquid crystal display device. In a region along the second side, the first seal member and the color filter do not overlap each other in plan view.

In the first side, an end face of the second substrate overlaps an end face of the color filter in plan view.

In the first side, an end face of the first substrate overlaps an end face of the source line in plan view.

The liquid crystal display device may further comprising a black image display region where a black image is always displayed in the region along the first side.

In the black image display region, the second substrate may includes the color filter, and the first substrate includes a TFT array.

The first substrate includes a TFT array non-forming region that does not include the TFT array on a side closer to the first side than the black image display region in the region along the first side.

The liquid crystal display device may further comprising: a second side that is opposed to the first side and constitutes at least a part of the outer shape of the liquid crystal display device; and a black image display region where a black image is always displayed in a region along the first side and the second side. A width of the black image display region in the region along the first side may be larger than a width of the black image display region in the region along the second side in plan view.

A light shielding tape may be disposed above the second substrate in the region along the first side.

A distance between the first substrate and the second substrate in the region along the first side may be smaller than a distance between the first substrate and the second substrate in the region along the second side.

In the region along the first side, an end face of the first substrate and an end face of the second substrate may not overlap each other in plan view.

In the region along the first side, the second substrate may be exposed from the first substrate in plan view from the first substrate.

The liquid crystal display device may, further comprising a resin film covering an end face of the second substrate in the first side.

The liquid crystal display device may, further comprising: a third side that intersects the first side and constitutes at least a part of the outer shape of the liquid crystal display device; and a fourth side that is opposed to the third side and constitutes at least a part of the outer shape of the liquid crystal display device. In a region along the third side and the fourth side, an end face of the first substrate and an end face of the second substrate do not overlap each other in plan view. In the first substrate, a driving circuit is provided in the region along the third side but a driving circuit is not provided in the region along the fourth side.

The first seal member may includes a first resin material and a first contained material contained in the first resin material in the region along the first side; and a second resin material and a second contained material contained in the second resin material in a region different from the region along the first side. A particle diameter of the first contained material may be smaller than a particle diameter of the second contained material.

The liquid crystal display device may further comprising a second seal member disposed in a region different from the region along the first side. The first seal member may include a first resin material and a first contained material contained in the first resin material. The second seal member may include a second resin material and a second contained material contained in the second resin material. A particle diameter of the first contained material may be smaller than a particle diameter of the second contained material.

The liquid crystal display device may, further comprising a third seal member that runs in parallel to the first seal member in the region along the first side.

In another general aspect, a method for manufacturing a liquid crystal display device of the instant application includes a first substrate preparing step of preparing a first substrate including a plurality of source lines and a plurality of gate lines; a second substrate preparing step of preparing a second substrate including a color filter; and a substrate bonding step of bonding the first substrate and the second substrate together using a first seal member. In the substrate bonding step, the first seal member is disposed in a manner that at least a part of the first seal member overlaps the color filter in plan view.

The above general aspect may include one or more of the following features.

In the substrate bonding step, the first seal member may be disposed in a manner that the first seal member and the color filter overlap each other in plan view, in a region along a first side constituting at least a part of an outer shape of the liquid crystal display device.

The method may further comprising a first cutting step of cutting the second substrate along a first cutting line overlapping the color filter in plan view.

The method may further comprising a second cutting step of dividing the first substrate along a second cutting line overlapping at least one of the plurality of source lines and the plurality of gate lines in plan view.

The method may further comprising a third cutting step of cutting a side where a driving circuit for a first display panel region is mounted while cutting a side where a driving circuit for a second display panel region is not mounted in the second substrate.

The first substrate may include the first display panel region and the second display panel region that is disposed so as to be adjacent to the first display panel region is prepared in the first substrate preparing step.

In the substrate bonding step, a region where one color filter is formed in the second substrate may be opposed to a region where a plurality of TFT arrays electrically insulated from each other are formed in the first substrate.

The method may further comprising a light shielding tape bonding step of disposing a light shielding tape on a display surface side of the second substrate in the region along the first side.

The method may further comprising a second seal member disposing step of disposing a second seal member different from the first seal member in a region different from the region along the first side that does not overlap the color filter in plan view.

The first seal member may includes a first resin material and a first contained material contained in the first resin material. The second seal member may include a second resin material and a second contained material contained in the second resin material. An average particle diameter of the first contained material may be smaller than an average particle diameter of the second contained material.

The method may further comprising a third seal member disposing step of disposing a third seal member that extends in parallel to the first seal member in a region where the first color filter is formed.

The method for manufacturing a liquid crystal display device may further comprising a resin film forming step of forming a resin film covering an end face of the second substrate in the first side.

With a liquid crystal display device according to the present disclosure, it is possible to further improve production efficiency.

BRIEF DESCRIPTION OF THE DRAWINGS

FIG. 16 is a plan view illustrating a state after the substrate bonding step in a method for manufacturing liquid crystal display device according to another exemplary embodiment.

DETAILED DESCRIPTION

[Liquid Crystal Display Device]

A liquid crystal display device according to this exemplary embodiment of the present disclosure will be described below with reference to the drawings. In the present exemplary embodiment, a liquid crystal display device of a Chip On Glass (COG) method is described as an example; however, the present disclosure is not limited thereto. A liquid crystal display device according to the present disclosure may be of, for example, a Chip On Film (COF) method or a Tape Carrier Package (TCP) method.

Figure 1:
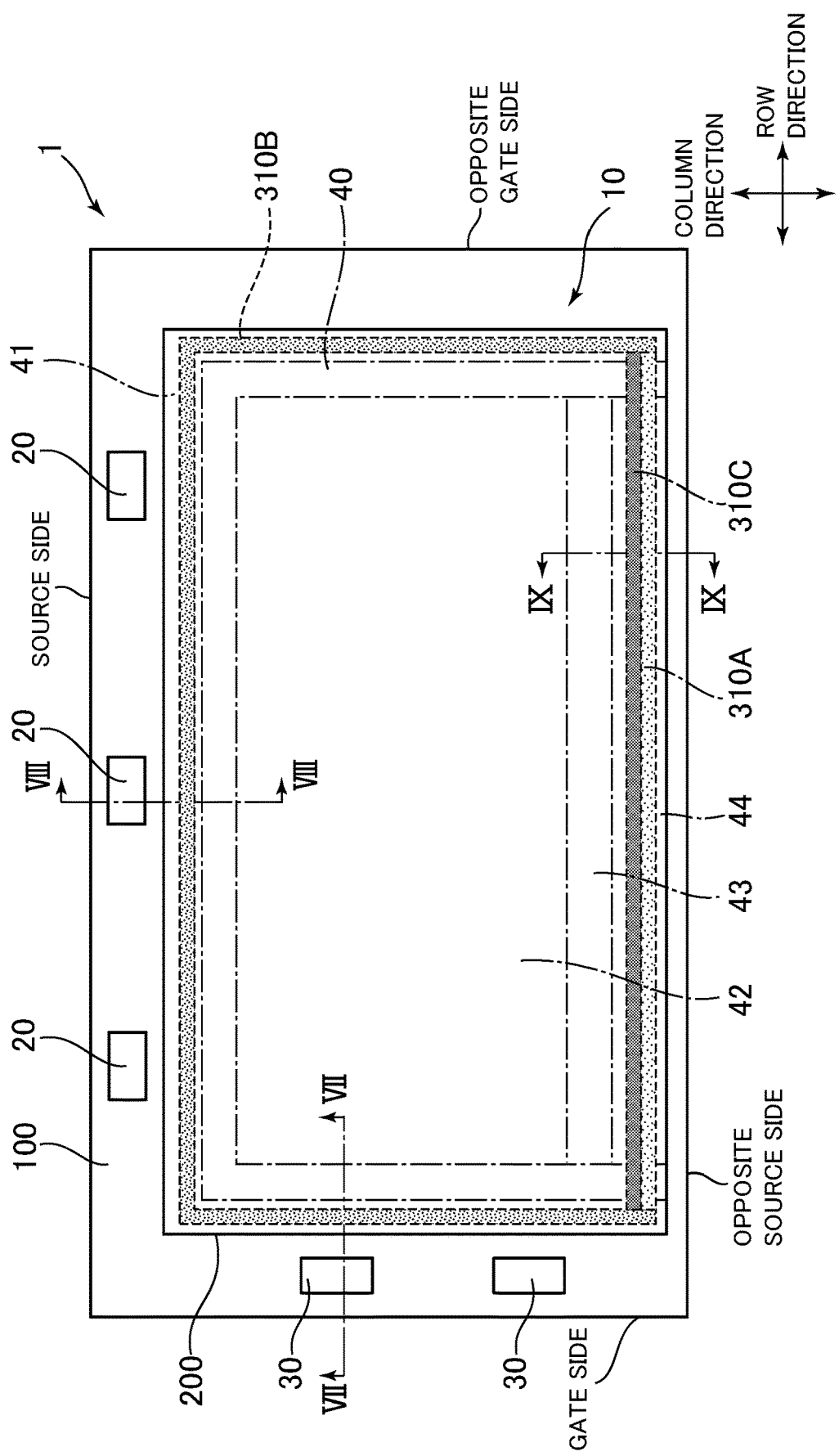
FIG. 1 is a plan view illustrating a schematic configuration of a liquid crystal display device according to a present exemplary embodiment.

FIG. 1 is a plan view illustrating a schematic configuration of a liquid crystal display device 1 according to the present exemplary embodiment. Liquid crystal display device 1 is configured to include a display panel 10, a source driver integrated circuit (IC) 20, a gate driver IC 30, and a backlight (not illustrated). Display panel 10 includes a thin film transistor substrate 100 (first substrate) including a plurality of source lines and a plurality of gate lines, a color filter substrate 200 (second substrate) including a color filter, and a liquid crystal layer (not illustrated) interposed between the two substrates.

A plurality of source driver ICs 20 are mounted on a region along a source side (second side) of thin film transistor substrate 100, and a plurality of gate driver ICs 30 are mounted on a region along a gate side (third side) of thin film transistor substrate 100. The number of source driver ICs 20 and the number of gate driver ICs 30 are not limited. In the present exemplary embodiment, an side opposite to the source side is defined as a opposite source side (first side), and an side opposite to the gate side is defined as a opposite gate side (fourth side).

In the present exemplary embodiment, thin film transistor substrate 100 and color filter substrate 200 overlap each other in plan view except not only the gate side (third side) where gate driver ICs 30 are mounted, but also the opposite gate side (fourth side) where gate driver ICs 30 are not mounted. More specifically, thin film transistor substrate 100 is exposed at the gate side and the opposite gate side as seen from the color filter substrate 200 side in plan view.

Display panel 10 includes a black matrix frame region 40, a color filter element layer non-formation region 41 disposed on an outer peripheral side of black matrix frame region 40 in plan view, a display region 42 disposed on an inner peripheral side of black matrix frame region 40 in plan view, a black image display region 43 disposed closer to a opposite source side side (a region along the opposite source side) than display region 42 is, in plan view, and a thin film transistor (TFT) array non-formation region 44 disposed closer to the opposite source side (the region along the opposite source side) than black image display region 43 is, in plan view.

Black matrix frame region 40 is a region where black matrixes 222 (see FIGS. 7 and 8) sandwiched between a glass substrate and an overcoat layer and formed in color filter substrate 200 in a frame shape overlap each other in plan view. In the present exemplary embodiment, black matrix frame region 40 is disposed along the gate side, the source side, and the opposite gate side, but is not disposed along the opposite source side. Black matrix frame region 40 is disposed on only both ends of the opposite source side.

Color filter element layer non-formation region 41 is a region overlapping a portion where a color filter element layer 220 (see FIGS. 7 and 8) including color filter 206 and black matrix 222 is not formed, in plan view, in color filter substrate 200, and is a region where an image cannot be displayed. In the present exemplary embodiment, color filter element layer non-formation region 41 is disposed along the gate side, the source side, and the opposite gate side, but is not disposed along the opposite source side. Color filter element layer non-formation region 41 is disposed on only both ends of the opposite source side.

In the present exemplary embodiment, a second seal member 310B is disposed between thin film transistor substrate 100 and color filter substrate 200 in color filter element layer non-formation region 41 to bond the two substrates together. Therefore, second seal member 310B and color filter 206 do not overlap each other on the source side, the gate side, and the opposite gate side, in plan view.

Display region 42 is a region overlapping color filter element layer 220 including color filter 206 and black matrix 222 in plan view and a region capable of displaying a desired image by controlling a data signal from source driver IC 20 and a gate signal from gate driver IC 30, in color filter substrate 200.

TFT array non-formation region 44 is a region overlapping a portion where a TFT array 22 (described later with reference to FIG. 2) is not formed in plan view and a region incapable of displaying an image, in thin film transistor substrate 100. Note that, some of the source lines and gate lines may be included in a part of the TFT array non-formation region.

In the present exemplary embodiment, a first seal member 310A is disposed between thin film transistor substrate 100 and color filter substrate 200 in TFT array non-formation region 44 to bond the two substrates together. Also in TFT array non-formation region 44, since color filter 206 (see FIG. 9) exists in color filter substrate 200, first seal member 310A and color filter 206 are superposed on each other in plan view. As illustrated in FIG. 1, in the region along the opposite source side, first seal member 310A extends from TFT array non-formation region 44 to an end of color filter element layer non-formation region 41 and is in contact with second seal member 310B.

Further, in the present exemplary embodiment, in the region along the opposite source side, a third seal member 310C is provided in parallel with first seal member 310A. Third seal member 310C also extends from TFT array non-formation region 44 to the end of color filter element layer non-formation region 41, and is in contact with second seal member 310B.

In the region where the seal member is arranged, since an alignment film cannot be formed, light from the backlight easily goes out of TFT array non-formation region 44 in TFT array formation region 44. It is therefore desired that the light from the backlight does not leak out of TFT array non-formation region 44 in such a manner that, for example, a black light blocking tape 402 (see FIG. 9) or the like is applied to the display surface side of TFT array non-formation region 44.

Black image display region 43 is a region where color filter element layer 220 (see FIG. 9) including color filter 206 and black matrix 222 formed in color filter substrate 200 and TFT array 22 formed on thin film transistor substrate 100 overlap each other in plan view, and is a region for always displaying a black image. Black image display region 43 always displays a black image, so that it is possible to display black on TFT array non-formation region 44 in a clean linear shape, for example, irrespective of the accuracy to bond light blocking tape 402 (see FIG. 9). In addition, black image display region 43 provided between the display region 42 side and TFT array non-formation region 44 makes it possible to suppress a leak of the light from the backlight out of TFT array non-formation region 44.

In the present exemplary embodiment, a sum of a width of black image display region 43 and a width of TFT array non-formation region 44 is larger than a width of black matrix frame region 40. The width of black image display region 43 refers to a length of black image display region 43 in a direction orthogonal to the opposite source side in plan view. The width of TFT array non-formation region 44 refers to a length of TFT array non-formation region 44 in the direction orthogonal to the opposite source side, in plan view. The width of black matrix frame region 40 refers to a length of black matrix frame region 40 in a direction orthogonal to the source side in plan view, in, for example, black matrix frame region 40 in the region along the source side.

Note that, although not illustrated in FIG. 1, black image display region 43 may be provided between black matrix frame region 40 and display region 42, for example, in the regions along the gate side, the source side, and the opposite gate side. However, even in such a case, in the present exemplary embodiment, the width of black image display region 43 in the region along the opposite source side is larger than the width of black image display region 43 in the regions along the gate side, the source side, and the opposite gate side, in plan view. Here, the width of black image display region 43 in the region along the source side refers to a length of black image display region 43 in a direction orthogonal to the source side, in plan view. The width of black image display region 43 in the region along the opposite source side refers to a length of black image display region 43 in the direction orthogonal to the opposite source side, in plan view. The width of black image display region 43 in the region along the gate side refers to a length of black image display region 43 in the direction orthogonal to the gate side, in plan view. The width of black image display region 43 in the region along the opposite gate side refers to a length of black image display region 43 in a direction orthogonal to the opposite gate side, in plan view.

As illustrated in FIG. 1, in the present exemplary embodiment, an end face of thin film transistor substrate 100 and an end face of color filter substrate 200 do not overlap each other in plan view, in the opposite source side. More specifically, in the opposite source side, the end face of thin film transistor substrate 100 is disposed outward of the end face of color filter substrate 200, and the surface of thin film transistor substrate 100 is exposed in plan view from the color filter substrate 200 side.

Note that in the opposite source side, the end face of thin film transistor substrate 100 may be disposed inward of the end face of color filter substrate 200, and the surface of color filter substrate 200 may be exposed in plan view from the thin film transistor substrate 100 side. Also in the opposite source side, the end face of thin film transistor substrate 100 may overlap the end face of color filter substrate 200 in plan view.

Figure 7:
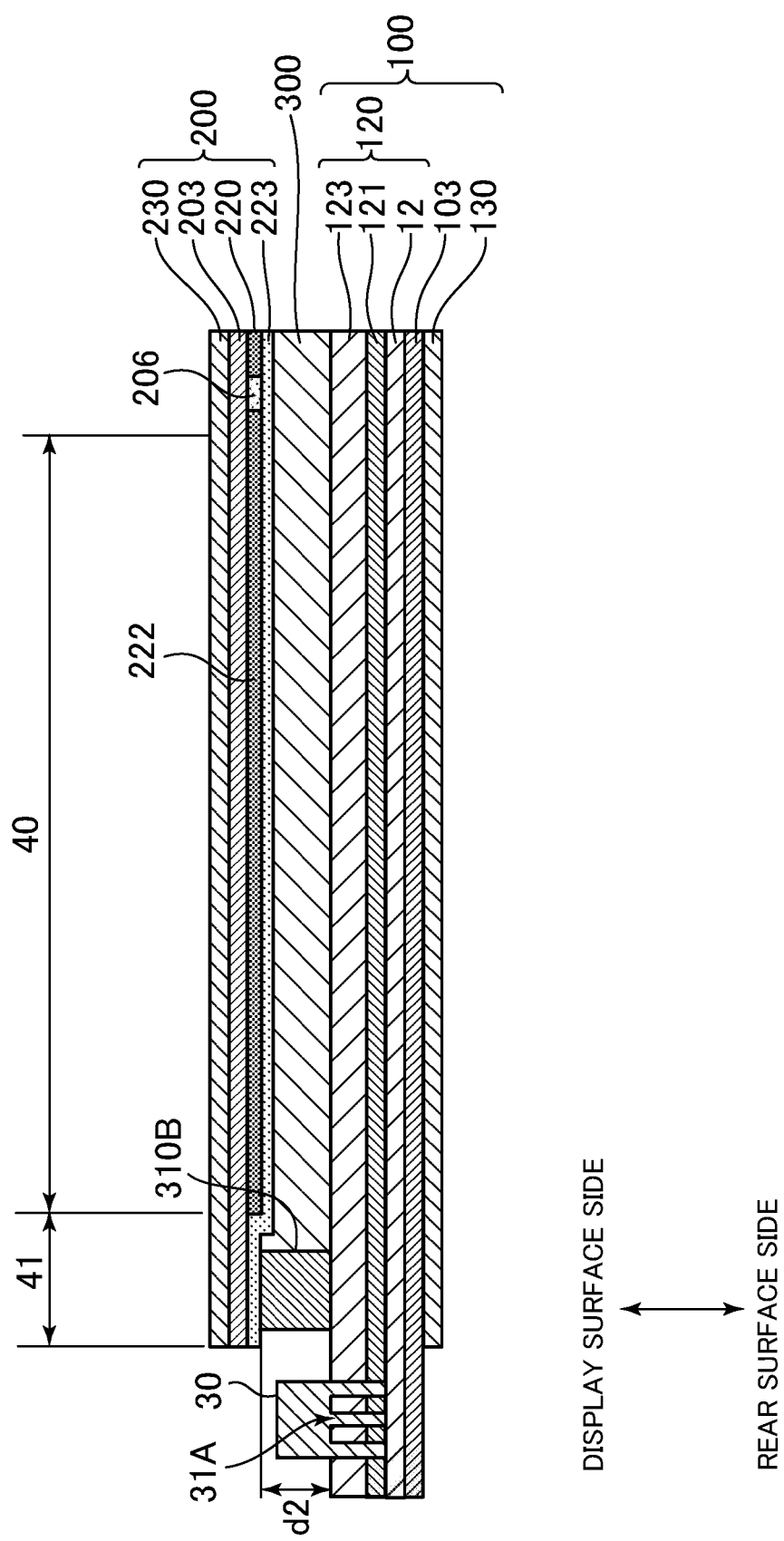
FIG. 7 is a sectional view illustrating a cross section taken along line VII-VII in FIG. 1.
Figure 8:
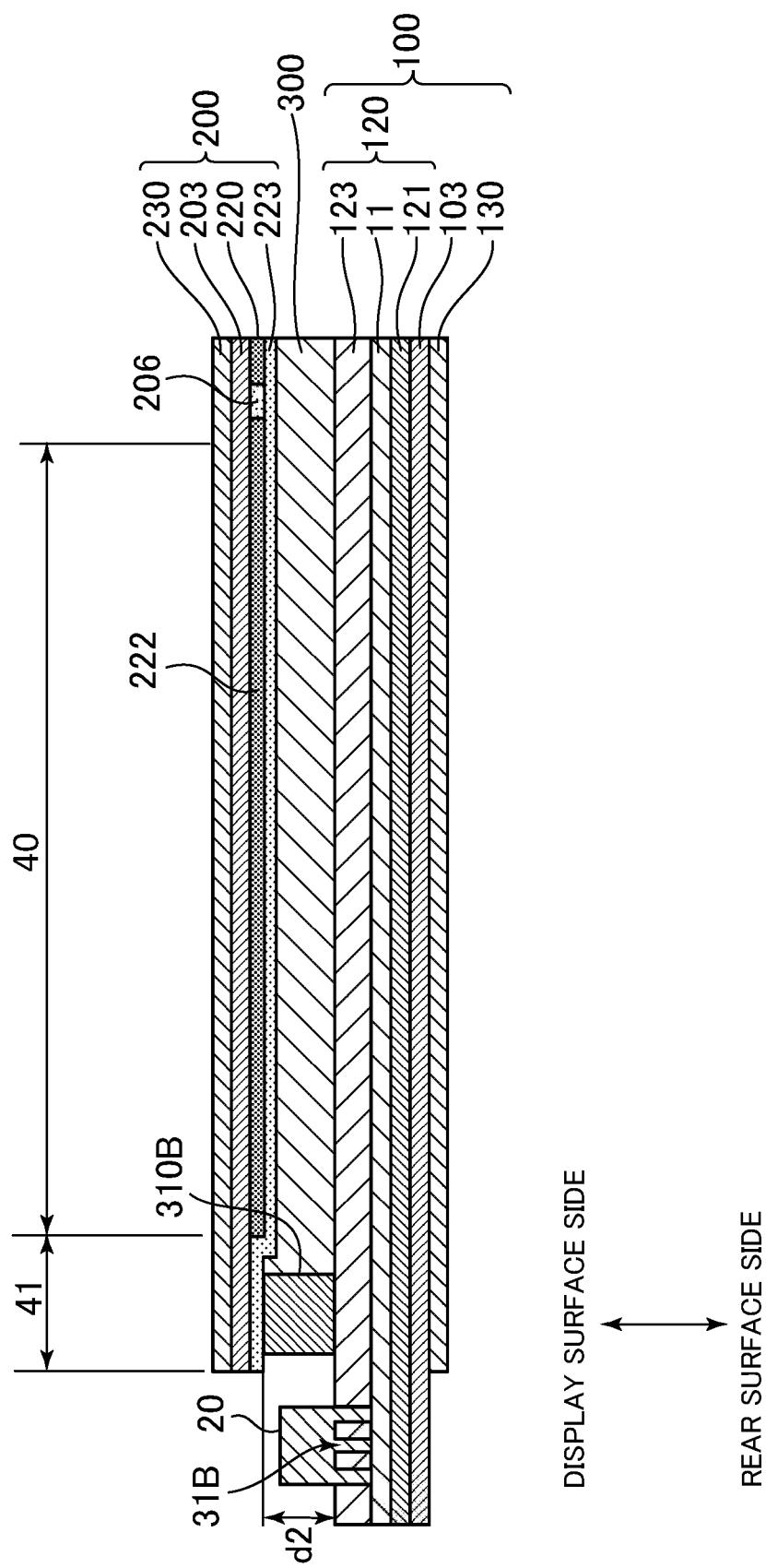
FIG. 8 is a sectional view illustrating a cross section taken along line VIII-VIII in FIG. 1.
Figure 9:
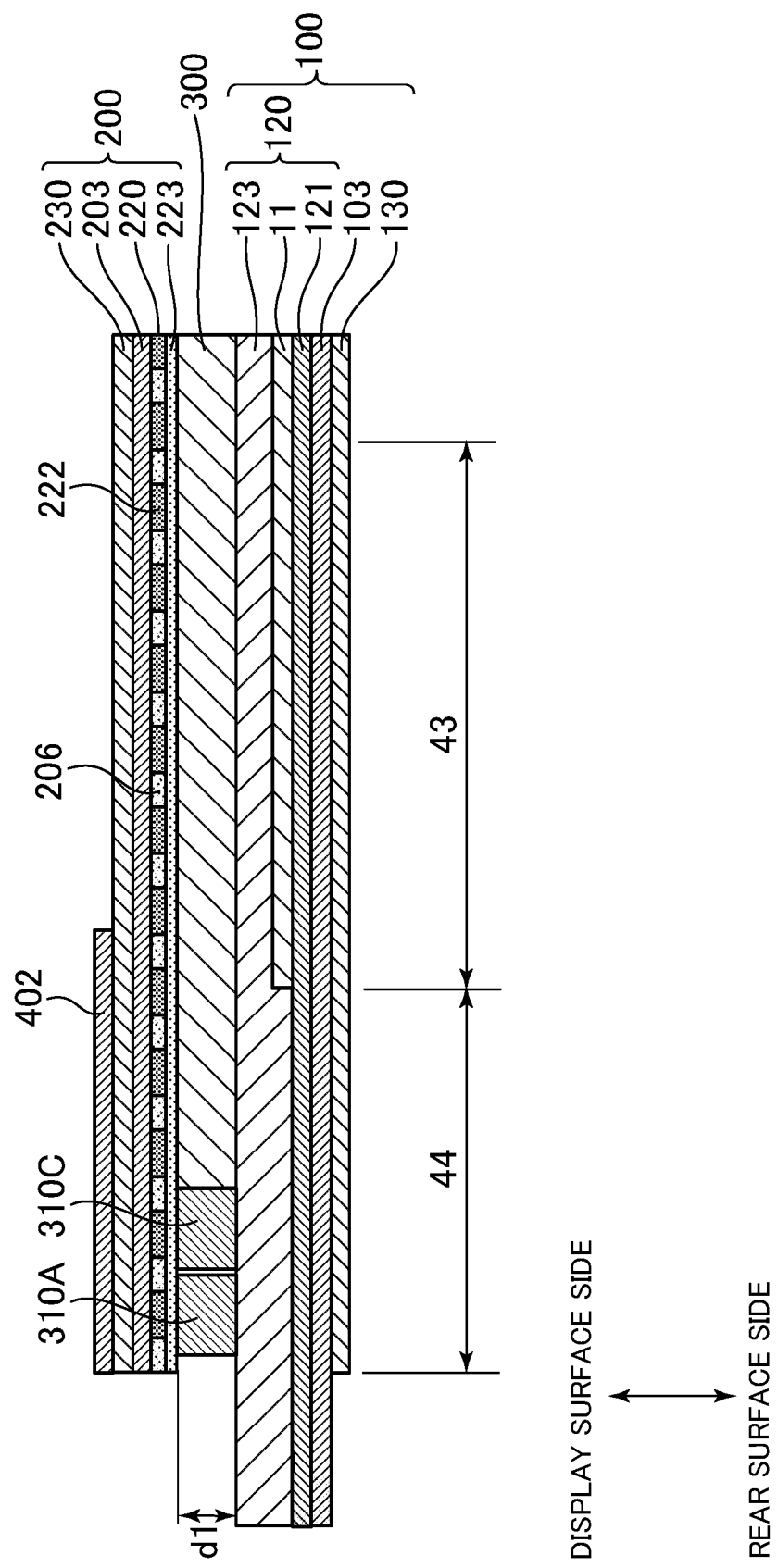
FIG. 9 is a sectional view illustrating a cross section taken along line IX-IX in FIG. 1.

FIG. 7 is a sectional view illustrating a cross section taken along line VII-VII in FIG. 1, and illustrates a cross section in the vicinity of the gate side. FIG. 8 is a sectional view illustrating a cross section taken along line VIII-VIII in FIG. 1, and illustrates a cross section in the vicinity of the source side. FIG. 9 is a sectional view illustrating a cross section taken along line IX-IX in FIG. 1, and illustrates a cross section in the vicinity of the opposite source side.

As illustrated in FIGS. 7, 8, and 9, thin film transistor substrate 100 includes a first flexible substrate 103 formed of a flexible material, a thin film transistor element layer 120 formed on the display surface side of first flexible substrate 103, and a first polarizing plate 130 formed on the rear surface side of first flexible substrate 103.

As illustrated in FIG. 7, in the region along the gate side, in a region closer to the gate side than color filter element layer non-formation region 41 is, a first terminal portion 31A is provided on the display surface side of thin film transistor element layer 120. First terminal portion 31A is electrically connected to gate driver IC 30. As illustrated in FIG. 8, in the region along the source side, in a region closer to the source side than color filter element layer non-formation region 41 is, a second terminal portion 31B is provided on the display surface side of thin film transistor element layer 120. Second terminal portion 31B is electrically connected to source driver IC 20.

As illustrated in FIG. 9, in the region along the opposite source side, from the end face of color filter substrate 200, a part of color filter 206 is exposed. That is, the end face of color filter substrate 200 overlaps the end face of color filter 206 in plan view.

As illustrated in FIGS. 7, 8, and 9, color filter substrate 200 includes a second flexible substrate 203 formed of a flexible material, a color filter element layer 220 formed on the rear surface side of second flexible substrate 203, an overcoat layer 223 formed on the rear surface side of color filter element layer 220, and a second polarizing plate 230 formed on the display surface side of second flexible substrate 203. Color filter element layer 220 includes color filter 206 and black matrix 222.

As illustrated in FIGS. 7, 8, and 9, a liquid crystal layer 300 is disposed between thin film transistor substrate 100 and color filter substrate 200, and first seal member 310A, second seal member 310B, and third seal member 310C are formed around liquid crystal layer 300. More specifically, as illustrated in FIGS. 7, 8, and 1, in the regions along the gate side, the source side, and the opposite gate side, second seal member 310B is formed around liquid crystal layer 300. As illustrated in FIGS. 9 and 1, in the region along the opposite source side, first seal member 310A and third seal member 310C disposed along first seal member 310A are formed around liquid crystal layer 300.

As illustrated in FIGS. 7 and 8, in the regions along the gate side and the source side, an end edge of color filter substrate 200 belongs to color filter element layer non-formation region 41. On the other hand, as illustrated in FIG. 9, in the region along the opposite source side, even in an end edge of color filter substrate 200, color filter element layer 220 is formed. Therefore, a distance d1 (see FIG. 9) between thin film transistor substrate 100 and color filter substrate 200 in the region along the opposite source side is smaller than a distance d2 (see FIGS. 7 and 8) between thin film transistor substrate 100 and color filter substrate 200 in the regions along the source side and the gate side, depending on a film thickness of color filter element layer 220. Also in the region along the opposite gate side, similar to the gate side and the source side, an end edge of color filter substrate 200 belongs to color filter element layer non-formation region 41. Therefore, a distance between thin film transistor substrate 100 and color filter substrate 200 in the region along the opposite gate side becomes distance d2, as in the gate side and the source side.

First seal member 310A includes a first resin material such as an epoxy resin, and a first contained material contained in the first resin material. Likewise, second seal member 310B includes a second resin material such as an epoxy resin, and a second contained material contained in the second resin material. Each of the first contained material and the second contained material is, for example, a glass fiber or a glass bead. From the relationship between distances d1 and d2, a thickness of first seal member 310A disposed along the opposite source side needs to be smaller than a thickness of second seal member 310B disposed along the gate side, the source side, and the opposite gate side. In the present exemplary embodiment, a particle size of the first contained material is smaller than a particle size of the second contained material. Therefore, the thickness of first seal member 310A disposed along the opposite source side is easily formed to be smaller than the thickness of second seal member 310B disposed along the gate side, the source side, and the opposite gate side. It does not matter whether the material constituting the first resin material and the material constituting the second resin material are the same.

In the present exemplary embodiment, first seal member 310A and second seal member 310B are separated from each other; however, first seal member 310A may be used as a seal member to be used for all the sides. Also in this case, from the reasons described above, the particle size of the contained material contained in the opposite source side where color filter 206 is included in the end face of color filter substrate 200 is desirably smaller than the particle size of the contained material contained in the other side where color filter element layer 220 is not included in the end face of color filter substrate 200.

Note that a particle size of a third contained material to be contained in third seal member 310C may be determined in accordance with a distance between thin film transistor substrate 100 and color filter substrate 200 in the region where third seal member 310C is formed. For example, in a case where the distance between color filter substrate 200 and thin film transistor substrate 100 in the region where third seal member 310C is formed is smaller than distance d1 described above, an average particle size of the third contained material may be smaller than an average particle size of the first contained material, or no contained material may be contained in third seal member 310C.

In addition, in the present exemplary embodiment, as illustrated in FIG. 9, an end of a source line 11 included in thin film transistor element layer 120 is not exposed from the end face of thin film transistor substrate 100; however, the end of source line 11 may be exposed from the end face of thin film transistor substrate 100. In this case, in the opposite source side, the end face of thin film transistor substrate 100 overlaps an end face of source line 11 in plan view.

Further, in the present exemplary embodiment, as illustrated in FIG. 9, in TFT array non-formation region 44 where TFT array 22 (see FIG. 2) is not formed in thin film transistor substrate 100, for example, black light blocking tape 402 is applied to the display surface side of color filter substrate 200. Light blocking tape 402 disposed on the display surface side of TFT array non-formation region 44 makes it possible to prevent a leakage of light from the backlight out of the display surface side of TFT array non-formation region 44.

Figure 10:
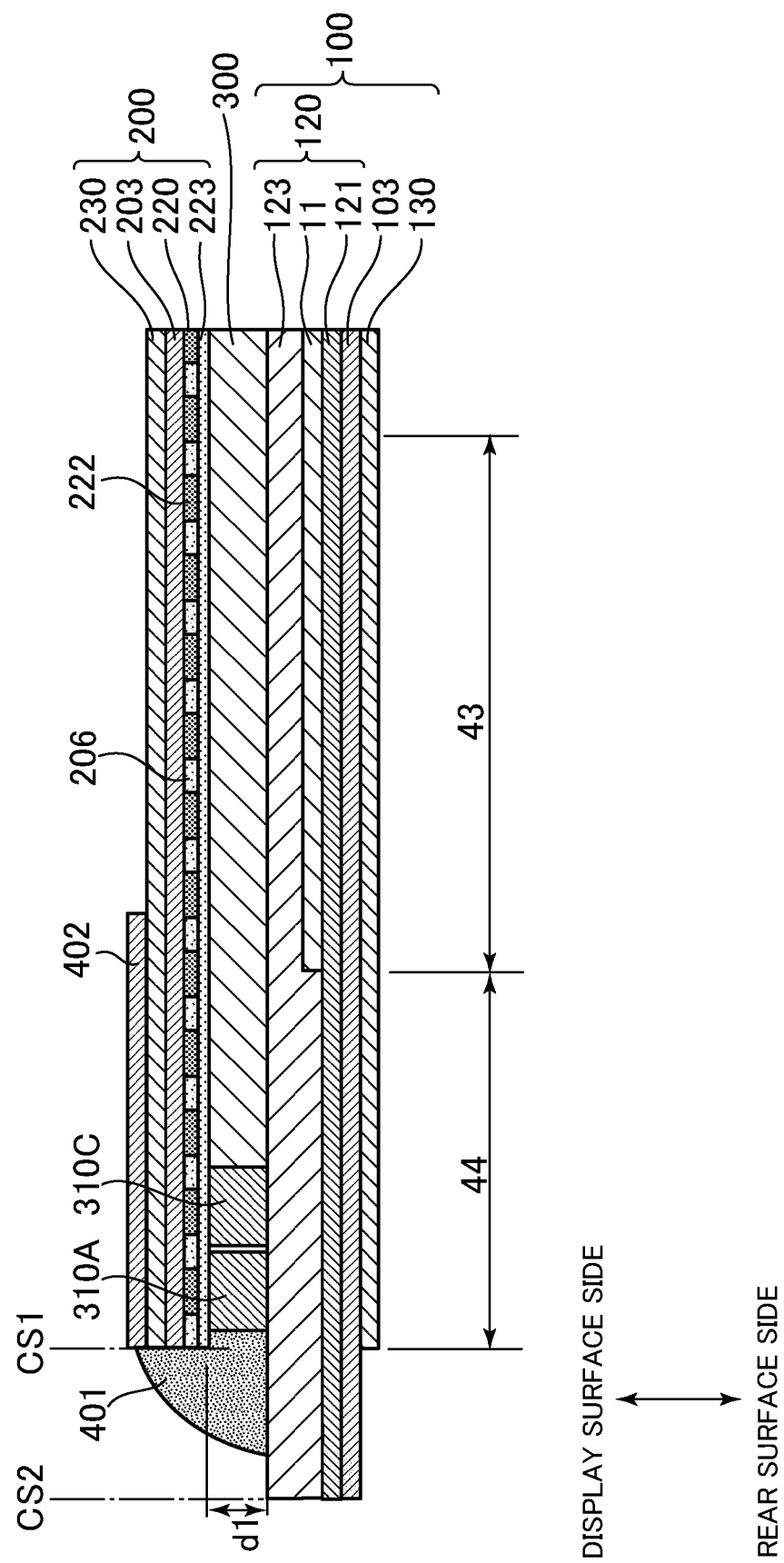
FIG. 10 is a sectional view illustrating a state in which the resin film forming step has been performed in a method for manufacturing liquid crystal display device according to the present exemplary embodiment.

Furthermore, in the example illustrated in FIG. 10, a resin film 401 is provided to cover the end face of color filter substrate 200. In the case where color filter element layer 220 is exposed from the end face of color filter substrate 200, intrusion of moisture from outside of liquid crystal display device 1 may cause swelling of black matrix 222 in color filter element layer 220. However, in the present exemplary embodiment, resin film 401 covers an end face of color filter substrate 200, thereby preventing moisture or the like from intruding into color filter element layer 220. As a result, it is possible to suppress swelling of black matrix 222 in color filter element layer 220 and to reduce a possibility that first seal member 310A is separated from color filter substrate 200. Note that resin film 401 may cover not only the end face of color filter substrate 200, but also an end face of thin film transistor element layer 120.

Note that, as described above with reference to FIG. 1, in the present exemplary embodiment, in the opposite source side, the end face of thin film transistor substrate 100 and the end face of color filter substrate 200 do not overlap each other in plan view. By such a configuration, resin film 401 is easily applied and is favorably retained.

Figure 2:
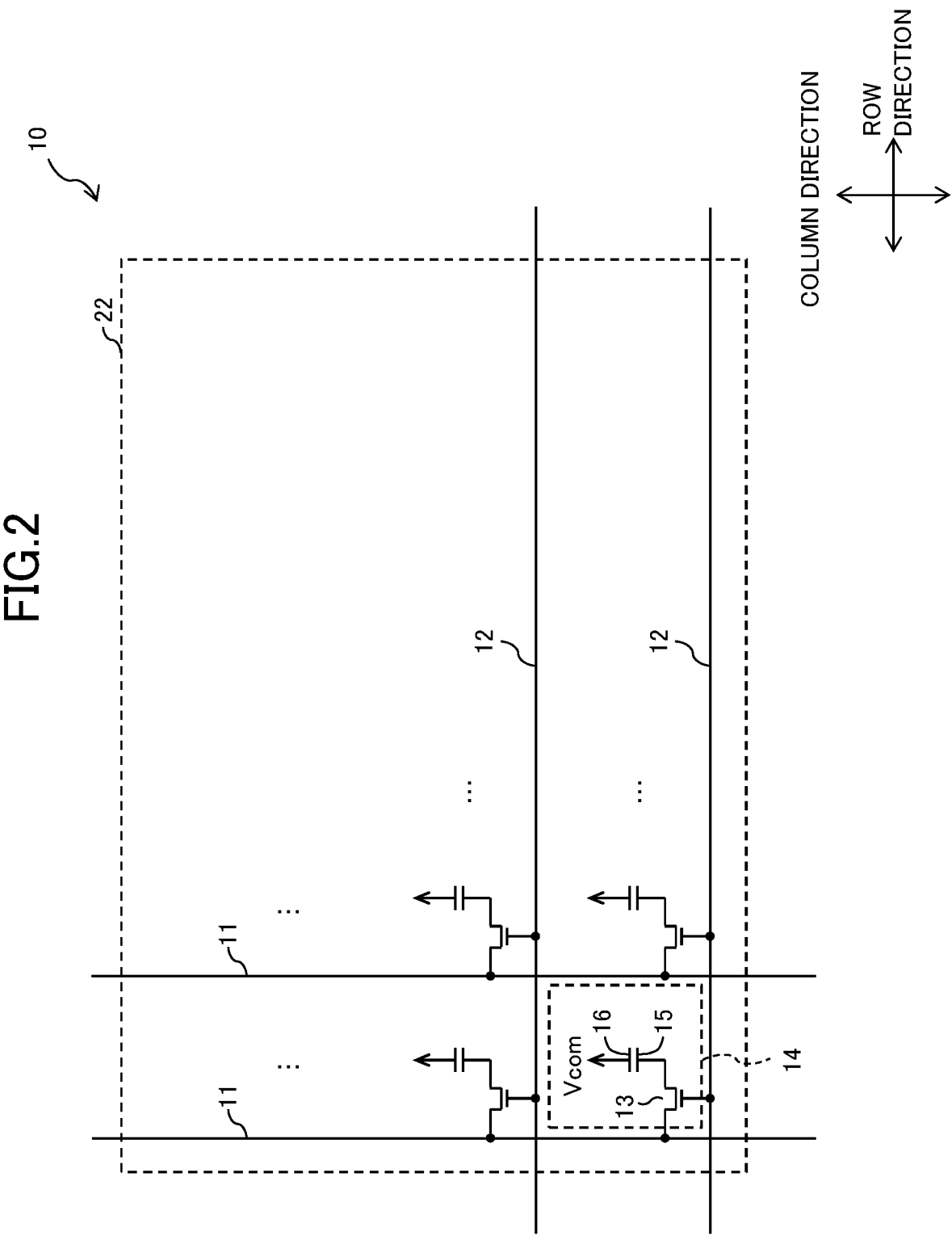
FIG. 2 is a plan view illustrating a schematic configuration of TFT array in display panel according to the present exemplary embodiment.

FIG. 2 is a plan view (equivalent circuit diagram) illustrating a schematic configuration of TFT array 22 in display panel 10. TFT array 22 includes a plurality of source lines 11 extending in a first direction (e.g., column direction) and a plurality of gate lines 12 extending in a second direction (e.g., row direction). At each intersection between each source line 11 and each gate line 12, and a thin film transistor 13 is provided. Each source line 11 is electrically connected to source driver IC 20 (see FIG. 1), and each gate line 12 is electrically connected to gate driver IC 30 (see FIG. 1). TFT array 22 also includes, in correspondence with the intersections between each of source lines 11 and each of gate lines 12, pixels 14 arranged in a matrix form (row direction and column direction), each of pixel electrodes 15 disposed for each pixel 14, and a common electrode 16 common to the pixels 14.

To each source line 11, a data signal (data voltage) is supplied from source driver IC 20. To each gate line 12, a gate signal (gate-on voltage, gate-off voltage) is supplied from gate driver IC 30. To common electrode 16, a common voltage Vcom is supplied from a common driver (not illustrated). When an ON voltage (gate-on voltage) of the gate signal is supplied to gate line 12, thin film transistor 13 connected to gate line 12 is turned on, and the data voltage is supplied to pixel electrode 15 via source line 11 connected to thin film transistor 13. An electric field is generated by a difference between the data voltage supplied to pixel electrodes 15 and common voltage Vcom supplied to common electrode 16. An image is displayed by driving a liquid crystal using this electric field to control the transmittance of light from the backlight. In a case of performing color display, color filters of red, green, and blue which are arranged in, for example, a stripe shape are arranged so as to correspond to each of pixels 14, and a desired data voltage is supplied to source line 11 connected to pixel electrode 15, so that color image display is realized.

Figure 3:
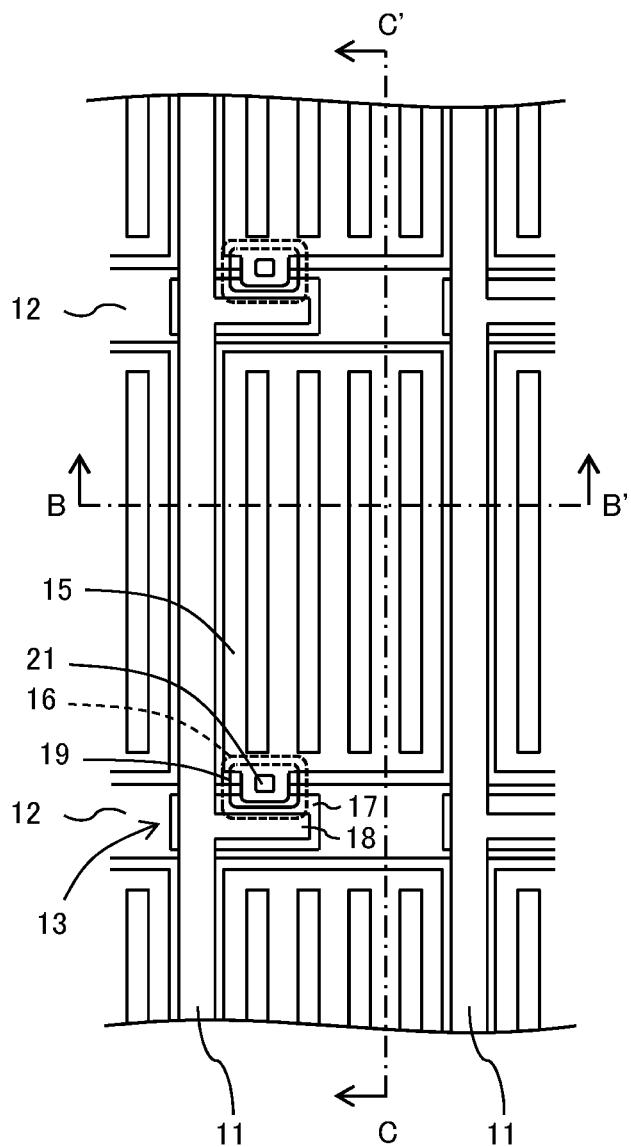
FIG. 3 is a plan view illustrating a configuration of pixel in display panel according to the present exemplary embodiment.
Figure 4:
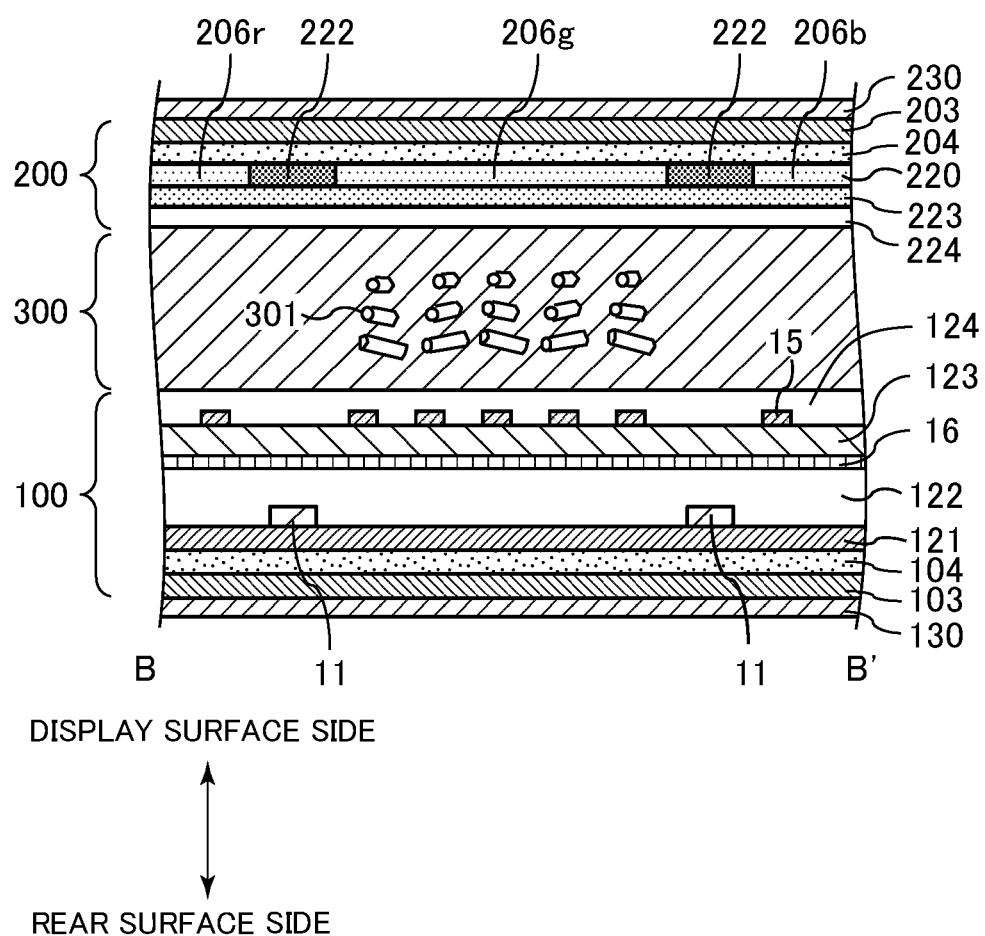
FIG. 4 is a sectional view illustrating a cross section taken along line B-B' in FIG. 3.
Figure 5:
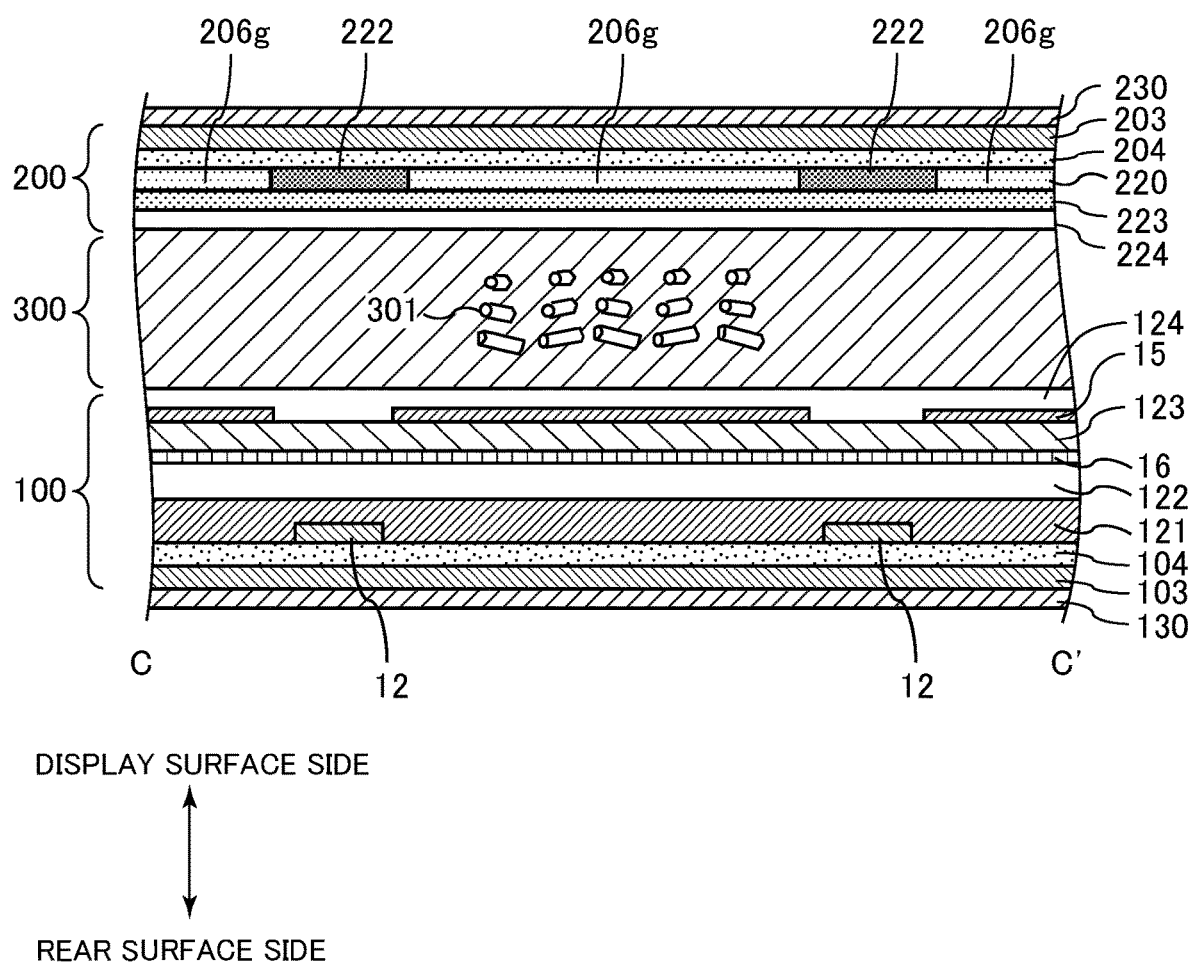
FIG. 5 is a sectional view illustrating a cross section taken along line C-C' in FIG. 3.

FIG. 3 is a plan view illustrating a configuration of pixel 14. FIG. 4 is a sectional view illustrating a cross section taken along line B-B' in FIG. 3, and FIG. 5 is a sectional view illustrating a cross section taken along line C-C' in FIG. 3. With reference to FIGS. 3, 4, and 5, a specific configuration of display panel 10 will be described.

In FIG. 3, a region defined by adjoining two of source lines 11 and adjoining two of gate lines 12 corresponds to one pixel 14. On each pixel 14, thin film transistor 13 is provided. As illustrated in FIG. 3, thin film transistor 13 includes a semiconductor layer 17 formed on an insulating film 121 (see FIG. 4), and a drain electrode 18 and a source electrode 19 each formed on semiconductor layer 17. Drain electrode 18 is electrically connected to source line 11, and source electrode 19 is electrically connected to pixel electrode 15 through a through-hole 21.

On each pixel 14, pixel electrode 15 as a transparent conductive film made of, for example, ITO is formed. Pixel electrode 15 has two or more openings (slits) and is formed in a stripe shape. In common to pixels 14, one common electrode 16 as a transparent conductive film made of, for example, ITO is formed in the entire display region. In common electrode 16, an opening for electrically connecting pixel electrode 15 to source electrode 19 is formed in a region that overlaps through-hole 21 and source electrode 19 of thin film transistor 13.

As illustrated in FIGS. 4 and 5, display panel 10 includes thin film transistor substrate 100 disposed on the rear surface side, color filter substrate 200 disposed on the display surface side, and liquid crystal layer 300 interposed between thin film transistor substrate 100 and color filter substrate 200.

As illustrated in FIG. 5, in thin film transistor substrate 100, gate line 12 is formed on the display surface side of first flexible substrate 103 through a first diffusion prevention layer 104, and insulating film 121 is formed to cover gate line 12. As illustrated in FIG. 4, source line 11 is formed on the display surface side of insulating film 121, and an insulating film 122 is formed to cover source line 11.

Common electrode 16 is formed on the display surface side of insulating film 122, and an insulating film 123 is formed to cover common electrode 16. Pixel electrode 15 is formed on the display surface side of insulating film 123, and a first alignment film 124 is formed to cover pixel electrode 15. On the rear surface side of first flexible substrate 103, first polarizing plate 130 is formed.

In color filter substrate 200, color filter element layer 220 is formed on the rear surface side of second flexible substrate 203 through a second diffusion prevention layer 204. Color filter element layer 220 includes black matrix 222 and color filters 206 (e.g., a red color filter 206r, a green color filter 206g, and a blue color filter 206b). Overcoat layer 223 is formed to cover the rear surface side of color filter element layer 220. A second alignment film 224 is formed on the rear surface side of overcoat layer 223. On the display surface side of second flexible substrate 203, second polarizing plate 230 is formed.

In liquid crystal layer 300, a liquid crystal 301 is sealed. Liquid crystal 301 may be a negative type liquid crystal of which the dielectric anisotropy is negative, or may be a positive type liquid crystal of which the dielectric anisotropy is positive.

Each of first alignment film 124 and second alignment film 224 may be an alignment film subjected to rubbing alignment treatment or an optical alignment film subjected to optical alignment treatment.

The stacked structure of each element constituting pixel 14 is not limited to the configurations of FIGS. 4 and 5. Alternatively, it is possible to apply a well-known configuration. Also in the present exemplary embodiment, liquid crystal display device 1 having a configuration of an In-Plane Switching (IPS) method is described as an example; however, the configuration of liquid crystal display device 1 is not limited to the above-described configuration.

[Method for Manufacturing Liquid Crystal Display Device]

Next, a method for manufacturing liquid crystal display device 1 according to the present exemplary embodiment will be described. The method for manufacturing liquid crystal display device 1 includes: a thin film transistor substrate preparing step (first substrate preparing step) of preparing thin film transistor substrate 100 (first substrate) including source lines and gate lines; a color filter substrate preparing step (second substrate preparing step) of preparing color filter substrate 200 (second substrate) including a color filter; a substrate bonding step of bonding thin film transistor substrate 100 and color filter substrate 200 together, using first seal member 310A; a first cutting step of cutting color filter substrate 200 for each display panel 10; a second cutting step of cutting thin film transistor substrate 100 for each display panel 10; a third cutting step of exposing the terminal portions (first terminal portion 31A, second terminal portion 31B); a separating step of separating the base glass substrate (first glass substrate 101, second glass substrate 201); and other steps.

Figure 6:
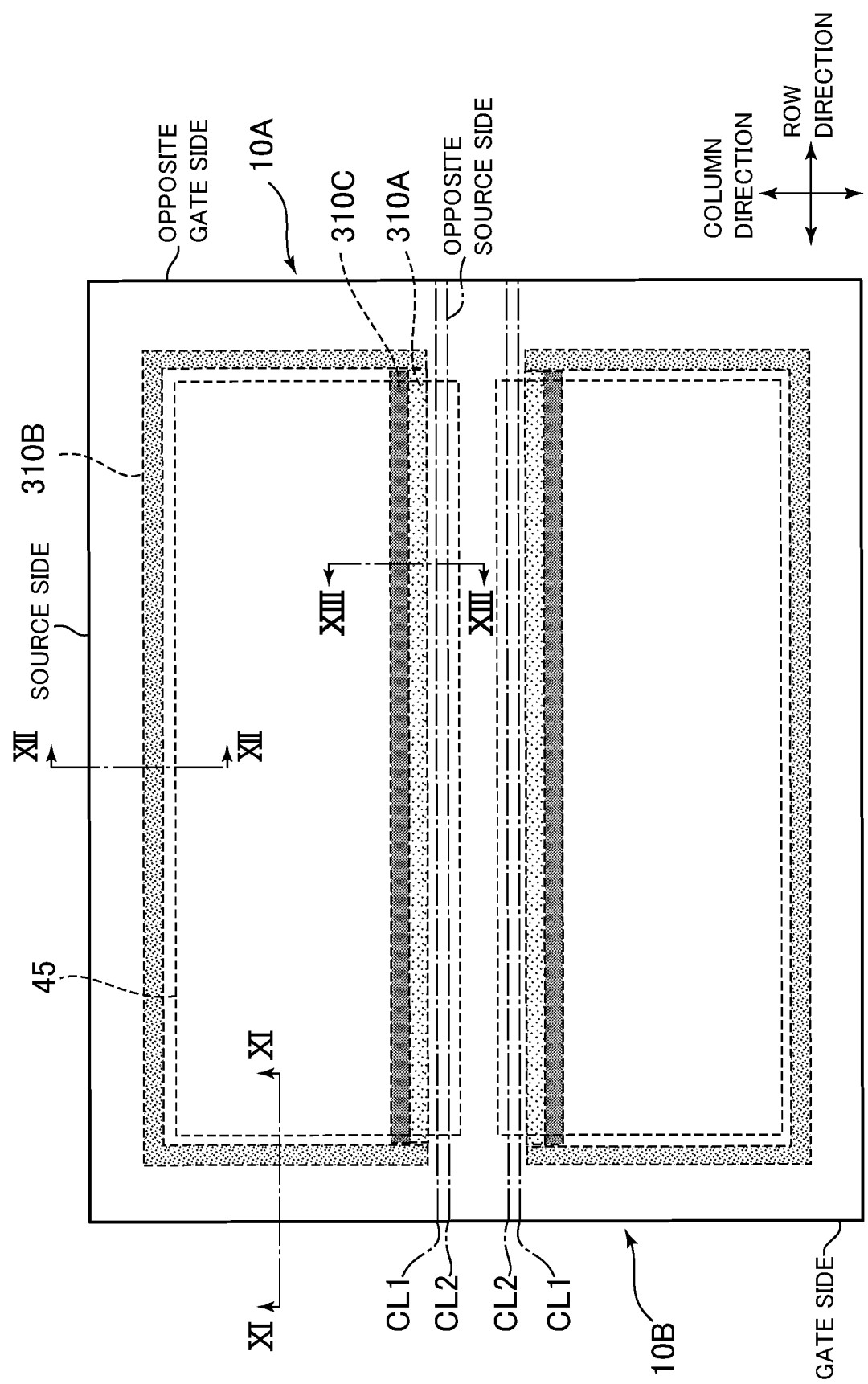
FIG. 6 is a plan view illustrating a state after the substrate bonding step in a method for manufacturing liquid crystal display device according to the present exemplary embodiment.
Figure 11:
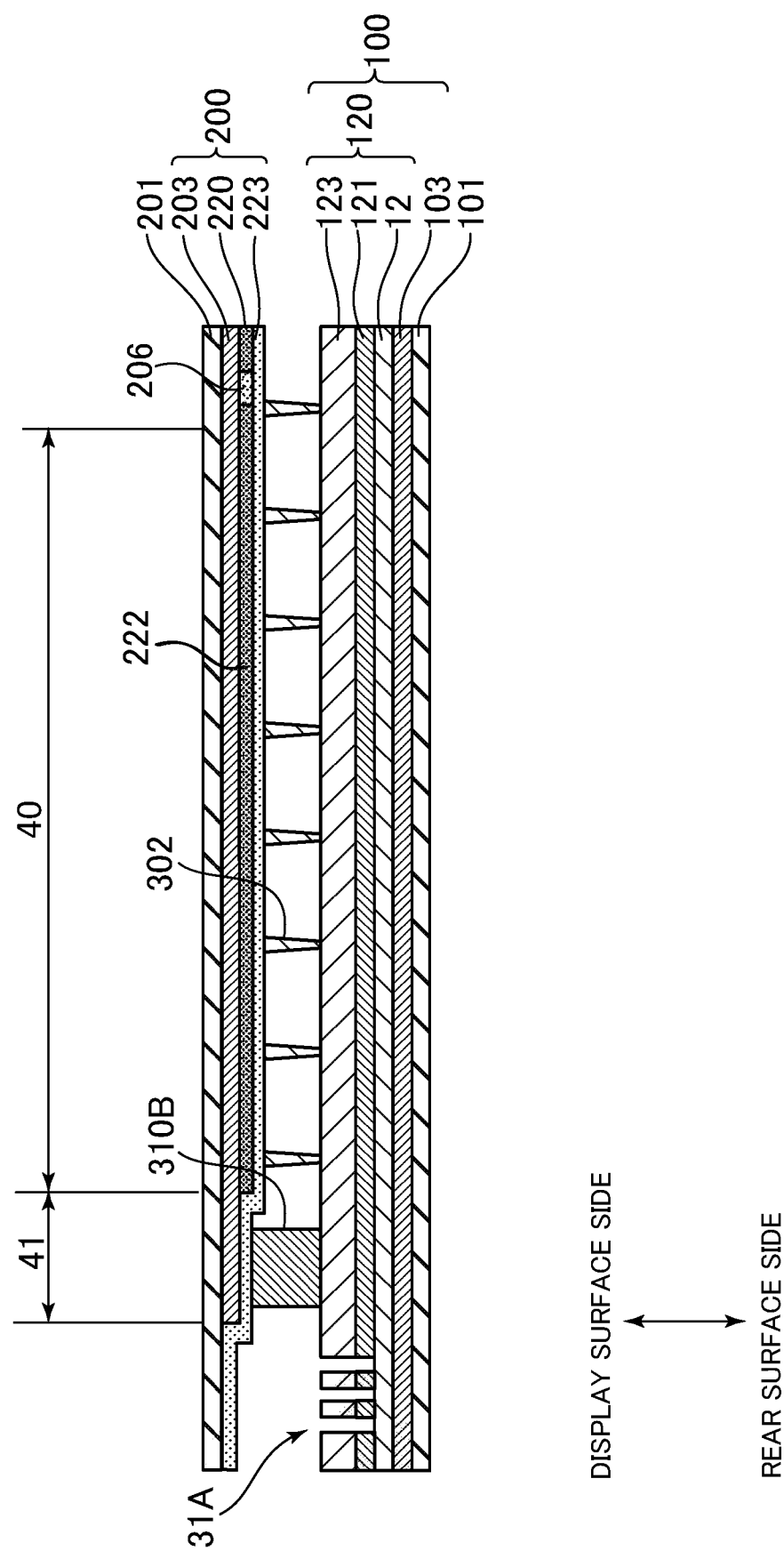
FIG. 11 is a sectional view illustrating a cross section taken along line XI-XI in FIG. 6.
Figure 12:
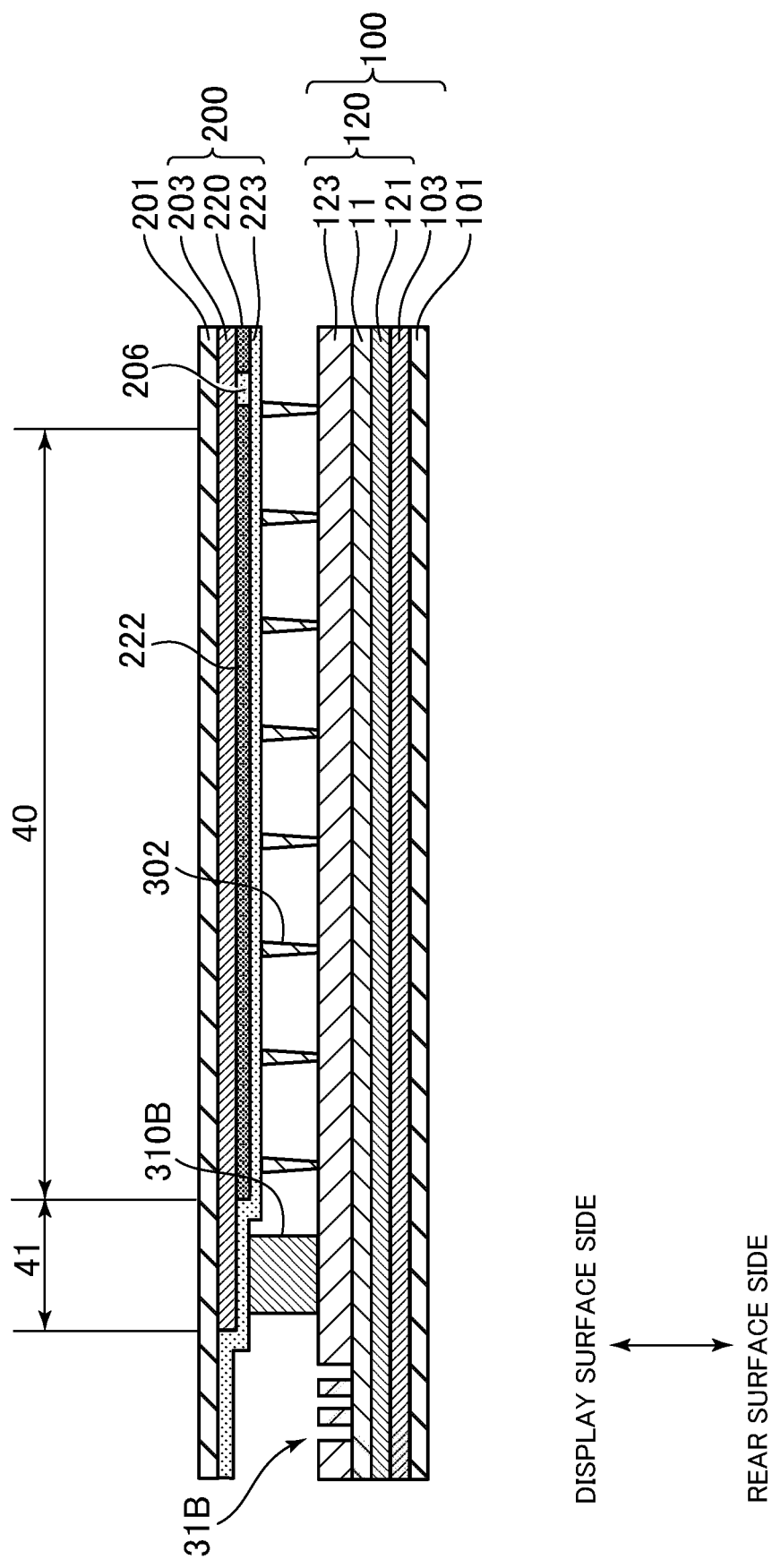
FIG. 12 is a sectional view illustrating a cross section taken along line XII-XII in FIG. 6.
Figure 13:
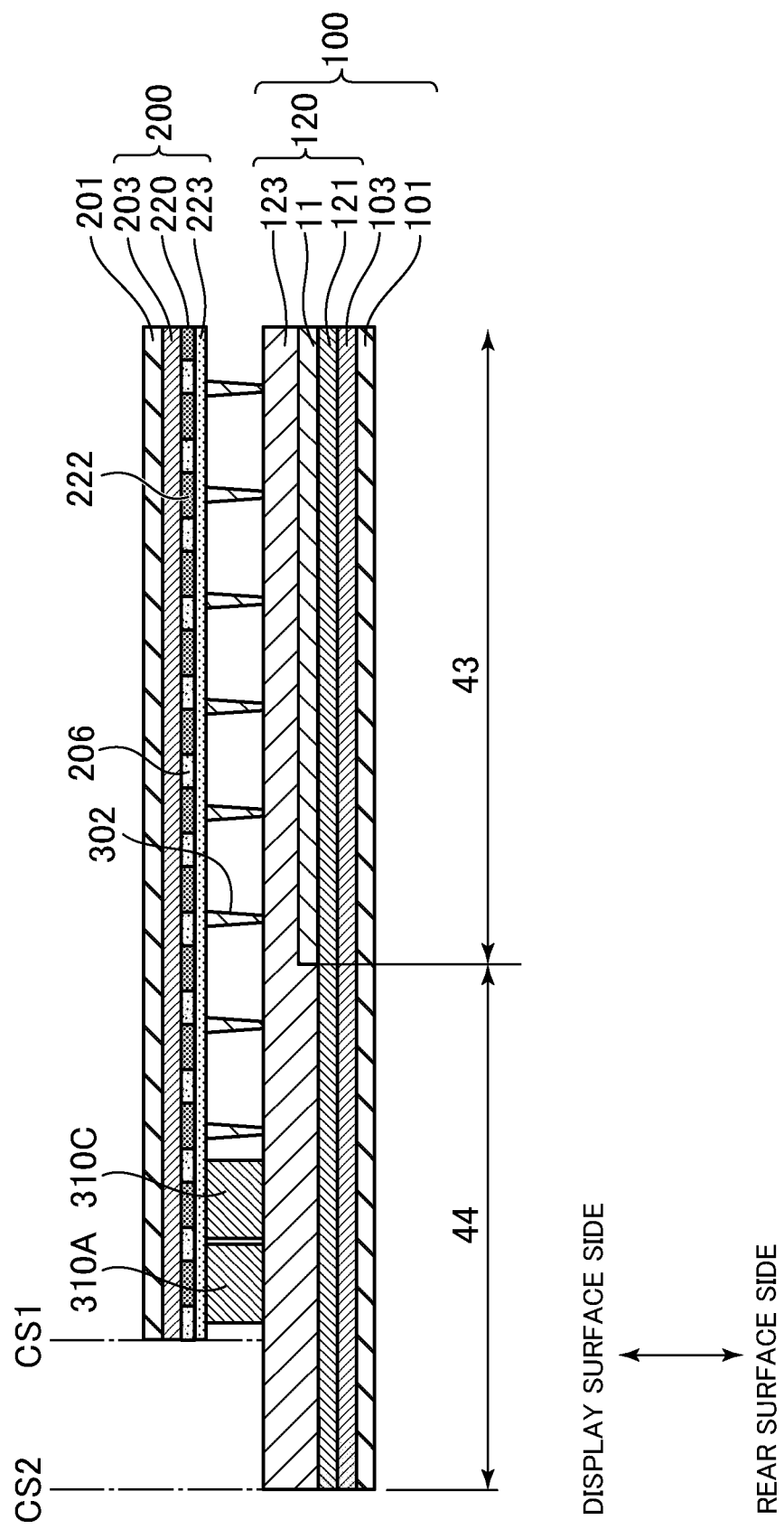
FIG. 13 is a sectional view illustrating a cross section taken along line XIII-XIII in FIG. 6.

FIG. 6 is a plan view illustrating a state after the substrate bonding step. FIG. 11 is a sectional view illustrating a cross section taken along line XI-XI in FIG. 6, and illustrates a cross section of the region along the gate side. FIG. 12 is a sectional view illustrating a cross section taken along line XII-XII in FIG. 6, and illustrates a cross section of the region along the source side. FIG. 13 is a sectional view illustrating a cross section taken along line XIII-XIII in FIG. 6, and illustrates a cross section of the region along the opposite source side. The example illustrated in FIG. 6 shows a step of manufacturing two display panels 10 (first display panel 10A, second display panel 10B) by cutting color filter substrate 200 along a first cutting line CL1 and cutting thin film transistor substrate 100 along a second cutting line CL2.

As illustrated in FIGS. 11 and 12, in the thin film transistor substrate preparing step, first, on the entire display surface-side surface of first glass substrate 101 (mother glass), an absorption film which absorbs a laser beam is formed, and a separation layer (not illustrated) is formed. Next, on the entire display surface-side surface of the separation layer, a flexible material mainly containing, for example, a polyimide resin is applied and then fired, so that first flexible substrate 103 is formed. Next, thin film transistor element layer 120 is formed on the display surface side of first flexible substrate 103. Thin film transistor element layer 120 includes each of components (e.g., source lines 11, gate lines 12, thin film transistors 13, pixel electrodes 15, common electrode 16, insulating film 121, insulating film 123) illustrated in FIGS. 4 and 5. Next, first terminal portion 31A and second terminal portion 31B are formed on the display surface side of thin film transistor element layer 120. First terminal portion 31A and second terminal portion 31B are formed on the side closer to the end edge than the region where second seal member 310B is formed is, in the substrate bonding step described later. Through the above-described steps, thin film transistor substrate 100 is manufactured. Note that, in thin film transistor substrate 100, the separation layer may be omitted.

In the thin film transistor substrate preparing step, TFT arrays 22 of thin film transistor substrate 100 may be formed in shapes corresponding to first display panel 10A and second display panel 10B, two TFT arrays 22 may be electrically insulated from each other, and one TFT array 22 may be formed to cover both first display panel 10A and second display panel 10B. In the present exemplary embodiment, TFT arrays 22 are formed in the shapes corresponding to first display panel 10A and second display panel 10B. Therefore, as illustrated in FIG. 13, TFT array non-formation region 44 where TFT array 22 is not formed is provided in thin film transistor substrate 100. Note that TFT array non-formation region 44 may include some of source lines 11 and gate lines 12.

In the color filter substrate preparing step, first, on the entire back surface-side surface of second glass substrate 201 (mother glass), an absorption film which absorbs a laser beam is formed, and a separation layer (not illustrated) is formed. Next, on the display surface side of the separation layer, a flexible material mainly containing, for example, a polyimide resin is applied and then fired, so that second flexible substrate 203 is formed. Note that second flexible substrate 203 is desirably formed in only a region excluding the region where first terminal portion 31A and second terminal portion 31B are formed in plan view, when thin film transistor substrate 100 is bonded. Examples of a method for applying the flexible material may include an ink jet method and a linear coater. Next, color filter element layer 220 is formed on the rear surface side of second flexible substrate 203. Color filter element layer 220 includes each of the components (e.g., color filter 206, black matrix 222) illustrated in FIGS. 4 and 5.

Here, in the present exemplary embodiment, color filter element layer 220 is formed in a color filter element layer formation region 45 illustrated in FIG. 6, regardless of the shape of display panel 10. Therefore, it is unnecessary to individually prepare masks in accordance with the shapes of display panels 10 (first display panel 10A, second display panel 10B), so that it becomes possible to form color filter element layer 220, using one mask prepared in advance. In the present exemplary embodiment, as illustrated in FIG. 6, two color filter element layer formation regions 45 are provided in accordance with the number of display panels 10. Alternatively, as illustrated in FIG. 16, one color filter element layer formation region 45 may be provided across first display panel 10A and second display panel 10B. In addition, a color filter element layer formation region 45 may be provided on the entire surface of color filter substrate 200.

Thereafter, as illustrated in FIGS. 11 and 12, overcoat layer 223 is formed to cover the rear surface side of color filter element layer 220. Through the above-described steps, color filter substrate 200 is manufactured. Note that, in color filter substrate 200, the separation layer may be omitted.

In the substrate bonding step, first, as illustrated in FIGS. 11 and 12, second seal member 310B is applied to the rear surface side of overcoat layer 223 of color filter substrate 200 manufactured through the color filter substrate preparing step, and first seal member 310A is applied as illustrated in FIG. 13. Here, as illustrated in FIGS. 6, 11, and 12, in the regions along the source side, the gate side, and the opposite gate side in first display panel 10A and second display panel 10B, a second seal member disposing step is performed, in which second seal member 310B is applied to color filter element layer non-formation region 41. Therefore, second seal member 310B does not overlap color filter 206 in plan view. On the other hand, as illustrated in FIGS. 6 and 13, in the region defined as the opposite source side after being cut along first cutting line CL1, first seal member 310A is applied so as to overlap color filter element layer 220 in plan view. That is, first seal member 310A is applied so as to overlap color filter 206 included in color filter element layer 220 in plan view, along first cutting line CL1 for cutting color filter substrate 200 in a cutting step described later. At this time, as illustrated in FIGS. 11, 12, and 13, spacers 302 for adjusting a clearance between color filter substrate 200 and thin film transistor substrate 100 are disposed between color filter substrate 200 and thin film transistor substrate 100.

Thereafter, liquid crystal 301 is dropped on the rear surface side of overcoat layer 223 of color filter substrate 200. Next, thin film transistor substrate 100 and color filter substrate 200 are bonded together and are irradiated with ultraviolet rays, so that first seal member 310A and second seal member 310B are cured. Note that, liquid crystal 301 may be injected into a region surrounded with first seal member 310A and second seal member 310B after thin film transistor substrate 100 and color filter substrate 200 are bonded together.

In the present exemplary embodiment, as described above, TFT array substrates 22 are formed in the shapes corresponding to first display panel 10A and second display panel 10B so as to be electrically insulated from each other. Therefore, as illustrated in FIG. 16, in the case of employing the method of providing one color filter element layer formation region 45 across two display panels 10 (first display panel 10A, second display panel 10B), one color filter element layer formation region 45 faces the region where the number of TFT arrays 22, which are electrically insulated from one another, are formed in thin film transistor substrate 100. That is, in the substrate bonding step, one region where color filter element layer 220 is formed faces TFT array 22 of first display panel 10A and TFT array 22 of second display panel 10B.

In the present exemplary embodiment, first seal member 310A is applied to the region along the opposite source side, and second seal member 310B is applied to the regions along the source side, the gate side, and the opposite gate side. Alternatively, first seal member 310A may be applied to all the sides. However, as described in the present exemplary embodiment, desirably, first seal member 310A applied to the region along the opposite source side formed when being cut along first cutting line CL1 is made different from second seal member 310B applied to the regions along the other sides, and the average particle size of the first contained material contained in first seal member 310A is smaller than the average particle size of the second contained material contained in second seal member 310B. In the present exemplary embodiment, each of the first contained material and the second contained material is, for example, a glass fiber or a glass bead and, in the case where the film thickness of color filter element layer 220 is, for example, 1.5 µm, the average particle size of the first contained material is, for example, 2.5 µm to 6.5 µm, and the average particle size of the second contained material is 4.0 µm to 8.0 µm.

Further, in the present exemplary embodiment, as illustrated in FIG. 6, a third seal member disposing step is performed, in which third seal member 310C provided in parallel with first seal member 310A is applied to the region along the opposite source side. Third seal member 310C is formed inward of first seal member 310A in first display panel 10A.

In the first cutting step, after the above-described substrate bonding step, color filter substrate 200 is separated into first display panel 10A and second display panel 10B and, in the second cutting step, thin film transistor substrate 100 is cut in accordance with the shape of first display panel 10A and the shape of second display panel 10B.

In the present exemplary embodiment, color filter substrate 200 is subjected to the first cutting step of cutting color filter substrate 200 along first cutting line CL1 illustrated in FIG. 6, so that color filter element layer 220 is formed in a rectangular shape of which the gate side length is shorter than that of color filter element layer formation region 45 formed in advance. Here, as illustrated in FIG. 6, first cutting line CL1 overlaps color filter element layer 220 in plan view.

Next, the second cutting step is performed, in which thin film transistor substrate 100 is cut along second cutting line CL2 illustrated in FIG. 6. Note that the first cutting step and the second cutting step may be performed simultaneously or may be provided as separate steps. For example, the cutting operation is made by infrared radiation using, for example, an infrared laser or an infrared lamp along first cutting line CL1 and second cutting line CL2 illustrated in FIG. 6. Alternatively, the cutting operation is made by, for example, a cutter along first cutting line CL1 and second cutting line CL2.

FIG. 13 is a sectional view illustrating a cross section taken along line XIII-XIII in FIG. 6, and illustrates a cross section of the region along the opposite source side. As illustrated in FIG. 13, color filter 206 is exposed from color filter substrate 200 at a first cutting plane CS1 including first cutting line CL1.

In addition, in the present exemplary embodiment, TFT arrays 22 are formed in the shapes corresponding to first display panel 10A and second display panel 10B. Therefore, as illustrated in FIG. 13, source lines 11 and gate lines 12 included in thin film transistor element layer 120 are not exposed from second cutting line CL2. Also in TFT array non-formation region 44 in which thin film transistor substrate 100 does not have TFT array 22, some of the source lines and gate lines 12 may be included.

Note that, in the above-described thin film transistor substrate preparing step, in the case where TFT array 22 is formed as a sheet of TFT array covering both first display panel 10A and second display panel 10B, second cutting line CL2 overlaps at least some of source lines 11 and gate lines 12 in plan view, and at least one of source lines 11 and gate lines 12 included in thin film transistor element layer 120 is exposed from a second cutting plane CS2 including second cutting line CL2.

In the example illustrated in FIG. 13, first cutting plane CS1 for cutting color filter substrate 200 is different from second cutting plane CS2 for cutting thin film transistor substrate 100. Alternatively, first cutting plane CS1 may be identical to second cutting plane CS2. However, considering a resin film forming step which will be described later, desirably, first cutting plane CS1 is different from second cutting plane CS2.

As illustrated in FIGS. 11 and 12, color filter element layer 220 is not formed in the regions where second seal member 310B is applied in the gate side, the source side, and the opposite gate side. On the other hand, as illustrated in FIG. 13, color filter element layer 220 is formed in the region where first seal member 310A is applied in the opposite source side. Therefore, first seal member 310A needs to be thinner than second seal member 310B by the thickness of color filter element layer 220. In this regard, as described above in the substrate bonding step, according to the present exemplary embodiment, the average particle size of the first contained material contained in first seal member 310A is smaller than the average particle size of the second contained material contained in second seal member 310B. As a result, first seal member 310A is easily formed to be thinner than second seal member 310B.

As illustrated in FIG. 13, color filter element layer 220 is exposed from first cutting plane CS1. Therefore, the intrusion of moisture from outside of liquid crystal display device 1 may cause swelling of black matrix 222 contained in color filter element layer 220. However, as described above in the substrate bonding step, according to the present exemplary embodiment, third seal member 310C is applied in parallel with first seal member 310A and is formed inward of first seal member 310A in first display panel 10A. Therefore, the swelling of black matrix 222 can reduce the possibility of separation of first seal member 310A. Also, even if first seal member 310A is separated, third seal member 310C itself can prevent moisture from intruding into liquid crystal layer 300 illustrated in FIG. 9.

Note that the particle size of the third contained material to be contained in third seal member 310C may be determined in accordance with the distance between thin film transistor substrate 100 and color filter substrate 200 in the region where third seal member 310C is formed. For example, in the case where the distance between color filter substrate 200 and thin film transistor substrate 100 in the region where third seal member 310C is formed is smaller than distance d1 described above, the average particle size of the third contained material may be smaller than the average particle size of the first contained material, or no contained material may be contained in third seal member 310C.

Figure 14:
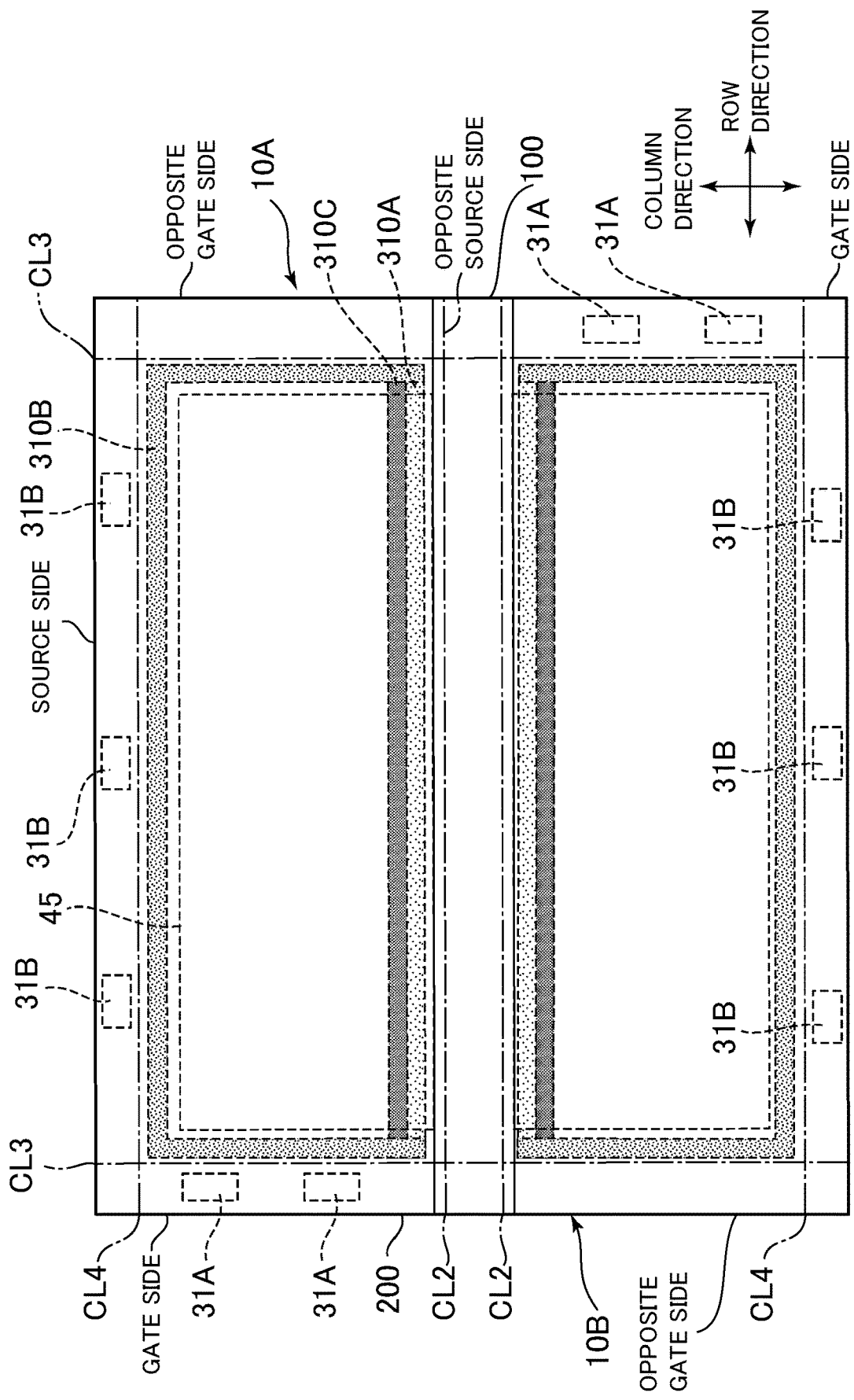
FIG. 14 is a plan view illustrating a third cutting step in a method for manufacturing liquid crystal display device according to the present exemplary embodiment.

FIG. 14 is a plan view illustrating a state before performing the second cutting step of cutting thin film transistor substrate 100 along second cutting line CL2, after the first cutting step of cutting color filter substrate 200 along first cutting line CL1. With reference to FIG. 14, the third cutting step will be described. In the third cutting step, as illustrated in FIG. 14, a portion overlapping with first terminal portion 31A and second terminal portion 31B in plan view in color filter substrate 200 is removed. More specifically, when color filter substrate 200 is cut along the third cutting line CL3 along the gate side, first terminal portion 31A where gate driver IC 30 is mounted is exposed.

Further, when color filter substrate 200 is cut along a fourth cutting line CL4 along the source side, second terminal portion 31B where source driver IC 20 is mounted is exposed.

Here, as illustrated in FIG. 14, first display panel 10A and second display panel 10B are adjacent to each other, the opposite gate side of second display panel 10B is disposed on the side where the gate side of first display panel 10A is disposed, and the gate side of second display panel 10B is disposed on the side where the opposite gate side of the first display panel 10A is disposed. Therefore, when color filter substrate 200 is cut along third cutting line CL3, the opposite gate side, where gate driver IC 30 is not mounted, of first display panel 10A and the opposite gate side, where gate driver IC 30 is not mounted, of second display panel 10B are also cut. As a result, as illustrated in FIG. 1, also in the opposite gate side where gate driver IC 30 is not mounted, the end face of color filter substrate 200 does not overlap the end face of thin film transistor substrate 100 in plan view.

Note that the third cutting step may be performed after the second cutting step of cutting thin film transistor substrate 100 along second cutting line CL2.

Figure 15:
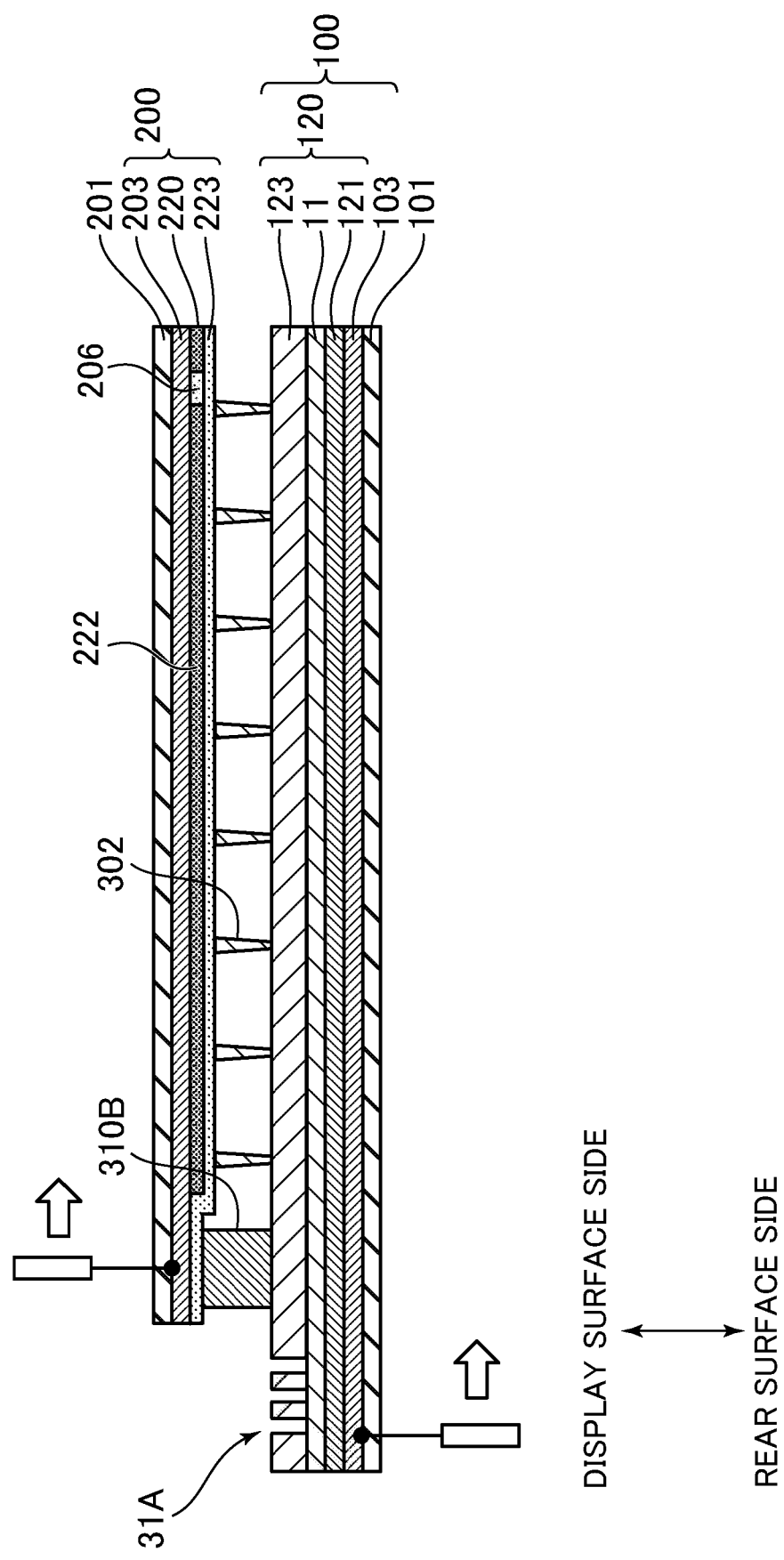
FIG. 15 is a diagram illustrating the separating step in a method for manufacturing liquid crystal display device according to the present exemplary embodiment.

FIG. 15 is a diagram illustrating the separating step. In the separating step, as illustrated in FIG. 15, the separation layer between second glass substrate 201 and second flexible substrate 203 is irradiated with a laser beam (excimer laser), so that the separation layer is crystallized. A structural change in the course of crystallization causes separation of second flexible substrate 203 from the separation layer. Likewise, the separation layer between first glass substrate 101 and first flexible substrate 103 is irradiated with a laser beam, so that the separation layer is crystallized. A structural change in the course of crystallization causes separation of first flexible substrate 103 from the separation layer. After the separation of first glass substrate 101 and second glass substrate 201, as illustrated in FIGS. 7, 8, and 9, first polarizing plate 130 and second polarizing plate 230 are stuck. Further, even in a case where there is no separation layer, by optimizing the laser radiation conditions, the glass substrate may be separated from the flexible substrate, using a difference in volume expansion based on a temperature change in the glass substrate and the flexible substrate.

FIG. 9 is a sectional view illustrating a state in which a light blocking tape applying step has been performed. In the light blocking tape applying step, as illustrated in FIG. 9, in TFT array non-formation region 44 where TFT array 22 is not formed, black light blocking tape 402 is applied to the display surface side of color filter substrate 200, for example. Light blocking tape 402 applied to the display surface side of color filter substrate 200 in TFT array non-formation region 44 makes it possible to prevent a leakage of light from the backlight out of the display surface side of TFT array non-formation region 44.

FIG. 10 is a sectional view illustrating a state in which the resin film forming step has been performed. In the resin film forming step, as illustrated in FIG. 10, resin film 401 is applied to cover first cutting plane CS1 which is the cutting plane of color filter substrate 200. Resin film 401 covering the first cutting plane CS1 makes it possible to prevent moisture from intruding into color filter element layer 220. Note that resin film 401 may cover not only the end face of color filter substrate 200, but also an end face of thin film transistor element layer 120.

Considering the case of performing the resin film forming step, as described above in the first cutting step and the second cutting step, desirably, first cutting plane CS1 is different from second cutting plane CS2 which is the cutting plane of thin film transistor substrate 100. First cutting plane CS1 is made different from second cutting plane CS2 since resin film 401 is easily applied and is favorably retained.

Through the above-described steps, liquid crystal display device 1 is manufactured. According to the above-described manufacturing method, in the color filter substrate preparing step, color filter element layer 220 can be formed using one mask prepared in advance, regardless of the shapes of display panels 10 (first display panel 10A, second display panel 10B). Therefore, it becomes possible to form color filter element layer 220 without preparing a mask individually for the shape of each display panel 10. This results in further improvement of production efficiency.

In the present exemplary embodiment, the rectangular display panel 10 is formed. Alternatively, the shape of display panel 10 is not limited to a rectangular shape. For example, display panel 10 may be formed in a shape having a curved edge.

Although the exemplary embodiment of the present disclosure is described above, the present disclosure is not limited to the exemplary embodiment. It is noted that exemplary embodiments properly changed from the exemplary embodiment described above by those skilled in the art without departing from the scope of the present disclosure are included in the present disclosure.

What is claimed is:

1. A method for manufacturing a liquid crystal display device, the method comprising:
    a first substrate preparing step of preparing a first substrate including a plurality of source lines and a plurality of gate lines;
    a second substrate preparing step of preparing a second substrate including a color filter;
    a substrate bonding step of bonding the first substrate and the second substrate together using a first seal member; and
    a first cutting step of cutting the first substrate along a first cutting line overlapping at least one of the plurality of source lines and the plurality of gate lines in plan view,
    wherein in the substrate bonding step, the first seal member is disposed in a manner that at least a part of the first seal member overlaps the color filter in plan view.

2. The method for manufacturing a liquid crystal display device according to claim 1, wherein in the substrate bonding step, the first seal member is disposed in a manner that the first seal member and the color filter overlap each other in plan view, in a region along a first side constituting at least a part of an outer shape of the liquid crystal display device.

3. The method for manufacturing a liquid crystal display device according to claim 2, further comprising a light shielding tape bonding step of disposing a light shielding tape on a display surface side of the second substrate in the region along the first side.

4. The method for manufacturing a liquid crystal display device according to claim 2, further comprising a second seal member disposing step of disposing a second seal member different from the first seal member in a region different from the region along the first side that does not overlap the color filter in plan view.

5. The method for manufacturing a liquid crystal display device according to claim 4, wherein
    the first seal member includes a first resin material and a first contained material contained in the first resin material,
    the second seal member includes a second resin material and a second contained material contained in the second resin material, and
    an average particle diameter of the first contained material is smaller than an average particle diameter of the second contained material.

6. The method for manufacturing a liquid crystal display device according to claim 2, further comprising a resin film forming step of forming a resin film covering an end face of the second substrate in the first side.

7. The method for manufacturing a liquid crystal display device according to claim 1, further comprising a second cutting step of cutting the second substrate along a second cutting line overlapping the color filter in plan view.

8. The method for manufacturing a liquid crystal display device according to claim 1, further comprising a third cutting step of cutting a side where a driving circuit for a first display panel region is mounted while cutting a side where a driving circuit for a second display panel region is not mounted in the second substrate,
    wherein the first substrate including the first display panel region and the second display panel region that is disposed so as to be adjacent to the first display panel region is prepared in the first substrate preparing step.

9. The method for manufacturing a liquid crystal display device according to claim 1, wherein in the substrate bonding step, a region where one color filter is formed in the second substrate is opposed to a region where a plurality of TFT arrays electrically insulated from each other are formed in the first substrate.

10. The method for manufacturing a liquid crystal display device according to claim 1, further comprising a third seal member disposing step of disposing a third seal member that extends in parallel to the first seal member in a region where the color filter is formed.

* * * * *